US009247320B2

(12) United States Patent
Ho et al.

(10) Patent No.: US 9,247,320 B2
(45) Date of Patent: *Jan. 26, 2016

(54) CAPACITY ALLOCATION OF CALL-HANDLING DEVICES ACROSS CALL DESTINATIONS

(71) Applicant: Tata Communications (America) Inc., Herndon, VA (US)

(72) Inventors: Roy Ho, Morganville, NJ (US); Aakratee Saini, Monroe Township, NJ (US); Kesava R. Pokkunuri, Morganville, NJ (US)

(73) Assignee: Tata Communications (America) Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/638,300

(22) Filed: Mar. 4, 2015

(65) Prior Publication Data

US 2015/0181312 A1    Jun. 25, 2015

Related U.S. Application Data

(63) Continuation of application No. 14/139,191, filed on Dec. 23, 2013, now Pat. No. 9,020,126.

(51) Int. Cl.
*H04M 7/00* (2006.01)
*H04Q 3/00* (2006.01)
*H04Q 3/66* (2006.01)

(52) U.S. Cl.
CPC ........... *H04Q 3/0091* (2013.01); *H04Q 3/0066* (2013.01); *H04Q 3/66* (2013.01); *H04Q 2213/13561* (2013.01)

(58) Field of Classification Search
CPC .................................................. H04Q 3/0091
USPC ............. 379/221.03, 221.01, 221.05, 201.01, 379/207.02, 221.07; 455/436, 439, 440
See application file for complete search history.

(56) References Cited

U.S. PATENT DOCUMENTS

| 4,669,113 A | 5/1987 | Ash et al. |
| 2008/0165685 A1 | 7/2008 | Weiss et al. |
| 2008/0261597 A1 | 10/2008 | Hayama et al. |
| 2011/0256874 A1* | 10/2011 | Hayama et al. ............... 455/437 |

FOREIGN PATENT DOCUMENTS

EP        0496061 A2    7/1992

OTHER PUBLICATIONS

"Parent U.S. Appl. No. 14/139,191", "Notice of Allowance", Dec. 5, 2014, Publisher: USPTO, Published in: US.
"International Search Report and Written Opinion", issued in related International Application No. PCT/US2014/071977, on Mar. 11, 2015.

* cited by examiner

*Primary Examiner* — Thjuan K Addy
(74) *Attorney, Agent, or Firm* — Kaplan Breyer Schwarz & Ottesen, LLP

(57) ABSTRACT

A system and method that allocate call capacity based on the need to divide the call capacities of at least some call-termination devices across geographic regions. Accordingly, the allocation system uses various input parameters as constraints in a linear programming optimization, which has the objective of maximizing the capacity allocation of a device to fulfill the traffic demands of each region being processed. The input parameters that are used include i) the traffic demand forecast of each geographic region being evaluated, ii) the available call capacity of each call-termination device, iii) the call destinations associated with each region, and iv) service levels associated with each given call destination. Call-capacities are separately allocated for i) the predicted traffic that is expected in the next time period and ii) an additional margin of excess traffic above and beyond the expected traffic.

20 Claims, 16 Drawing Sheets

CAPACITY ALLOCATION OF CALL-HANDLING DEVICES ACROSS CALL DESTINATIONS

CROSS-REFERENCE TO RELATED APPLICATION(S)

This application is a continuation of application Ser. No. 14/139,191, filed Dec. 23, 2013, incorporated herein by reference.

FIELD OF THE INVENTION

The present invention relates to telecommunications in general, and, more particularly, to allocating call capacity of call-handling devices to one or more call destinations.

BACKGROUND OF THE INVENTION

FIG. 1A depicts a schematic diagram of a portion of telecommunications system 100 that is typical in the prior art. Telecommunications system 100 comprises: a source of traffic demand forecasts 105, a source of route characteristics (or corresponding supplier facility characteristics) 106, route table generators 107-1 through 107-M, and route servers 109-1 through 109-N, wherein M and N are positive integers. FIG. 1A additionally depicts: call origin 101, incoming route 103, outgoing routes 121, 122, and 123, and call destination 113, which are interconnected within telecommunications system 100 as shown.

Call origin 101, which is well known in the art, represents a point where a call is initiated such as a telephone, a mobile station, a computer, etc., without limitation.

Incoming route 103, which is well known in the art, comprises one or more telecommunications facilities that collectively are capable of carrying a call (whether a voice call, a text message, or a data session) from call origin 101 to route servers 109, e.g., trunks, switches, networks, sub-networks, the U.S. public switched telephone network, a national telecommunications network, the Internet, etc. Incoming route 103 can be circuit-switched, packet-switched, or a combination thereof, without limitation.

Traffic demand forecasts 105, which are well known in the art, are stored in one or more data structures, and comprise predicted telecommunications traffic data for one or more periods of time, for one or more call destinations. Traffic demand forecasts are calculated based on prediction algorithms, for each hour. For example and without limitation, traffic demand forecasts 105 comprise, per call destination in a given period of time, the number of predicted calls. Traffic demand forecasts 105 may be stored in a component of route table generator 107 or in a stand-alone component, or may be supplied by an outside system, or a combination thereof, etc., without limitation.

Route characteristics 106, which are well known in the art, are stored in one or more data structures, and comprise information about any facilities and outgoing routes emanating from route server 109. For example and without limitation, route characteristics 106 comprise the call capacity of each available outgoing route and/or outgoing facility (i.e., "call-termination device") emanating from route server 109 typically measured in calling minutes available per hour; historical information about the routes/facilities, such as maintenance periods when a facility or route might be completely unavailable; and other historical performance data such as failure rates that measure the reliability of the route/facility. Route characteristics 106 may be stored in a component of route table generator 107 or in a stand-alone component, or may be supplied by an outside system, or a combination thereof, etc., without limitation.

Route table generator 107-$m$, which is well known in the art, is based on a processor or data-processing system or other computing platform; m has a value between 1 and M, inclusive. Route table generator 107-$m$ receives traffic demand forecasts 105 and route characteristics 106 and, based on these and other data, generates one or more route tables for the use of route server 109.

Route server 109-$n$, which is well known in the art, is based on a processor, data-processing system, computing platform, call-processing system, or call-switching platform; n has a value between 1 and N, inclusive. Route server 109-$n$ may be co-resident with route table generator 107-$m$ or may be a separate component from route table generator 107-$m$. Route server 109-$n$ receives calls via one or more incoming routes such as incoming route 103 and, based on the contents of the route table generated by route-table generator 107-$m$, selects a proper outgoing facility and/or outgoing route for each call.

For purposes of clarity, only route table generator 107-1 and route server 109-1 are depicted as being connected to other elements in the figure. According to the present figure, route server 109-1 is connected to incoming route 103, route table generator 107-1, and three possible outgoing routes—routes 121, 122, and 123. As those who are skilled in the art will appreciate, however, each of the other route table generators and route servers is connected to elements equivalent to those to which route table generator 107-1 and route server 109-1 are connected. As an example, route server 109-2 might be connected to incoming route 103, a different route table generator (e.g., generator 107-3, etc.), and one or more different outgoing routes than those depicted.

Routes 121, 122, and 123, which are well known in the art, each comprises one or more telecommunications facilities capable of carrying a call (whether a voice call, a text message, or a data session) from route server 109-$n$ to one or more call destinations (e.g., destinations 113 and 114, etc.) within one or more geographic regions, or to an intermediate destination, e.g., trunks, switches, networks, sub-networks, the U.S. public switched telephone network, a national telecommunications network, the Internet, etc. Outgoing routes 121, 122, and 123 each can be circuit-switched, packet-switched, or a combination thereof, without limitation.

Call destinations 113 and 114, which are well known in the art, each represents a termination point where a call can be answered, such as a telephone, a mobile station, a computer, a switch, an answering machine, an incoming voice-response system, etc., without limitation. A call destination can be represented by any suitable addressing scheme such as a dialed number, a "Dialed Number Identification Service" ("DNIS"), a "Uniform Resource Locator" ("URL"), or a data endpoint address, a country code, or a city code, or an area code, or a combination thereof, etc., without limitation. Call destination identification is well known in the art. Call destinations 113 and 114 can be situated in the same geographic region or in different geographic regions E.

FIG. 1B depicts a more detailed schematic diagram of a portion of prior-art telecommunications system 100 depicted in FIG. 1A, including call 1B being routed to and answered at call destination 114. In addition to the components and elements described in FIG. 1A, FIG. 1B additionally depicts: call 1B originating at call origin 101, a call attempt at the ingress to route server 109-1, a call seizure at the egress from route server 109-1 via outgoing route 123, and an answered call at call destination 114.

In processing call 1B, route table generator 107-1 generates a route table, which comprises route 123 for call destination 114 for the applicable time period. Route table generator 107-1 transmits the route table to route server 109-1. Route server 109-1 receives the route table and establishes it as the operative route table to be used during the applicable time period.

As shown here, call 1B comes into route server 109-1 as a call attempt. Route server 109-1 receives call 1B and applies the route table, which is the operative route table to be used during the present time period. According to the route table, route 123 is the only allowed route to be used during the present time period. Accordingly, route server 109-1 places call 1B onto the telecommunications facilities (i.e., one or more call-termination devices) corresponding to route 123, sending call 1B onwards towards call destination 114—this operation represents a call seizure.

As shown here, call 1B successfully reaches call destination 114, where the call is answered. Accordingly, call 1B is an answered call.

As discussed above, the traffic demand forecasts of various call destinations and the call capacities of call-termination devices are used for generating route tables and, as a result, for routing calls to the call destinations. In addition to the traffic demand forecasts and call capacities, various other input parameters are also considered in generating the route tables, such as the availabilities of call-termination devices, the historical performances of the call-termination devices, and any constraints imposed by technicians or other users. Traditionally, these input parameters have often been taken into account by using some degree of manual intervention on the part of the user.

There are several problems that can occur by using such manual intervention. First, the traffic demands of the various call destinations are, at times, difficult to predict and can change significantly from one time period to the next. For example, although it is common knowledge that call traffic occurring on a holiday such as Mother's Day is much higher than on other days, it is uncertain exactly how the added traffic will affect the individual call destinations. This results in blocked calls. Second, there is a significant amount of waste that occurs as a result of manually partitioning the call capacity allocated across geographic regions and across call destinations, within a given call-termination device. This is because a capacity partitioning that might be optimal for a first hourly period might be sub-optimal for the next hourly period. And third, although the capacity allocation is administered for each call-termination device, it is difficult to monitor the loads and capacities of the individual devices.

Therefore, what is needed is a capacity allocation system that avoids at least some of the disadvantages in the prior art.

SUMMARY OF THE INVENTION

The present invention enables the call capacities of one or more call-termination devices to be allocated to call destinations while overcoming at least some of the disadvantages of the prior art.

An illustrative capacity allocation system allocates call capacity, based on the need to divide the call capacities of at least some call-termination devices across geographic regions. Accordingly, the capacity allocation system first receives and validates input parameters for the time period currently being processed—such as the upcoming hour, for example. The input parameters used by the allocation system include, while not being limited to, the traffic demand forecast of each geographic region being evaluated. The forecast is based, at least in part, on using historical data that characterize the amount of traffic that has been received in each of the regions to then make a prediction for the next hour for each region.

The input parameters also include i) the available capacity of each call-termination device, in terms of calls per unit of time, such as calls per minute, ii) the call destinations associated with each region, iii) service levels, which are distinct offers to subscribers within each call destination, and iv) user overrides, as well as other input parameters disclosed herein.

The illustrative capacity allocation system then pre-processes the call-termination devices within the current geographic region being processed, by ranking those call-termination devices based on their capability of satisfying the region's demand. In other words, those devices that are allocable to the region are ranked.

The illustrative allocation system obtains a set of service priorities attributed to one or more call destinations. The set reflects a prioritization of the service levels across all of the call destinations belonging to the geographic region that is currently being processed.

After the prioritization has been obtained, for each service priority beginning with the highest service priority, the illustrative allocation system generates a capacity allocation solution for normal demand, for the call destination/service level combinations corresponding to the service priority currently being processed. Normal demand is related to the predicted traffic that is expected in the next time period.

After the capacity has been allocated based on the normal demand, the illustrative allocation system generates a capacity allocation solution for buffer demand, for the call destination/service level combinations corresponding to the service priority currently being processed. Buffer demand is related to an additional margin of excess traffic above and beyond the normal demand and applicable to the next time period.

The capacity allocation solutions for both normal demand and buffer demand are generated using a linear programming optimization. The linear program features an objective of maximizing the capacity allocation of a call-termination device in order to fulfill the traffic demands of the geographic region currently being evaluated. The linear program is subject to constraints, including those related to various input parameters, including the traffic demand forecasts and the capacities of the call-termination devices.

The illustrative allocation system then repeats the aforementioned operations for the next applicable geographic region. After all of the regions have been processed, the allocation system performs post-processing to allocate any remaining capacity of one or more call-termination devices, among other reasons. The allocation system then makes the results available to one or more route table generators and route servers, for the purpose of routing calls.

An illustrative method comprises:
  receiving, by a telecommunications system,
    i) a call capacity of each call-termination device in a plurality of call-termination devices,
    ii) a first call-traffic demand forecast for each of a plurality of call destinations within a first geographic region, and
    iii) a non-empty first set of service priorities attributed to the plurality of call destinations;
  ranking, by the telecommunications system, call-termination devices for the first geographic region, based on the call capacities of those call-termination devices in the plurality that are allocable to the first geographic region; and generating, by the telecommunications system, a first capacity allocation for each service priority in the first set of service priorities, based on:
i) an objective of maximizing capacity allocation of one or more call-termination devices to fulfill one or more call-related demands of the first geographic region, wherein the one or more call-related demands include the first call-traffic demand forecast for each of the plurality of call destinations within the first geographic region, and
ii) the ranking within the first geographic region; and
routing, by the telecommunications system, a plurality of calls according to the first capacity allocation.

An illustrative telecommunications system comprises:
a receiver for receiving:
i) a call capacity of each call-termination device in a plurality of call-termination devices,
ii) a first call-traffic demand forecast for each of a plurality of call destinations within a first geographic region, and
iii) a non-empty first set of service priorities attributed to the plurality of call destinations; and
a processor for:
a) ranking call-termination devices for the first geographic region, based on the call capacities of those call-termination devices in the plurality that are allocable to the first geographic region, and
b) generating a first capacity allocation for each service priority in the first set of service priorities, based on:
i) an objective of maximizing capacity allocation of one or more call-termination devices to fulfill one or more call-related demands of the first geographic region, wherein the one or more call-related demands include the first call-traffic demand forecast for each of the plurality of call destinations within the first geographic region, and
ii) the ranking within the first geographic region.

Another illustrative method comprises:
receiving, by a telecommunications system,
i) a call capacity of each call-termination device in a plurality of call-termination devices,
ii) a first call-traffic demand forecast for each of a plurality of call destinations within a first geographic region, wherein the first call-traffic demand forecast is based on the predicted call traffic that is expected in the time period to which a first capacity allocation will apply, and
iii) a second call-traffic demand forecast for each of the plurality of call destinations within the first geographic region, wherein the second call-traffic demand forecast is based on excess call traffic applicable to the time period to which a second capacity allocation will apply;
ranking, by the telecommunications system, the call-termination devices for the first geographic region, based on the call capacities of those call-termination devices in the plurality that are allocable to the first geographic region; and
generating, by the telecommunications system, the first and second capacity allocations, wherein the generating of:
i) the first capacity allocation is based on the first call-traffic demand forecast for each of the plurality of call destinations within the first geographic region,
ii) the second capacity allocation is based on the second call-traffic demand forecast for each of the plurality of call destinations within the first geographic region, and
iii) both capacity allocations is based on the ranking within the first geographic region; and
routing, by the telecommunications system, a plurality of calls according to the first and second capacity allocations.

DETAILED DESCRIPTION

For the purposes of the specification, the following terms and their inflected forms are defined as follows:
1. A call-termination device is defined as an outgoing route and/or outgoing facility that is used to route a telephone call to a called party.
2. call destination is defined as a termination point where a call can be answered. One or more call destinations are located within a geographic region
3. service level is defined as a distinct offer to one or more subscribers. A service level might reflect a particular quality-of-service or call quality that is different from that of another service level, but the term is not to be construed as pertaining only to quality-of-service or call quality. Some examples of service levels, without limitation, are "Budget", "Prime", "Call Center", Call Center Enterprise", and so on. When a particular call destination and a particular service level are combined with each other, the combination is referred to in this specification as a "call destination/service level."

4. service priority is defined as an indication of the importance of a predefined group of one or more call destination/service levels. There can be more than one service priority within a given geographic region, wherein a first group of one or more call destination/service levels has a first service priority, in relation to a second group having a second service priority, and so on. The number of service priorities is a positive integer.

Other terms may be defined elsewhere in the present disclosure.

Figure 2:
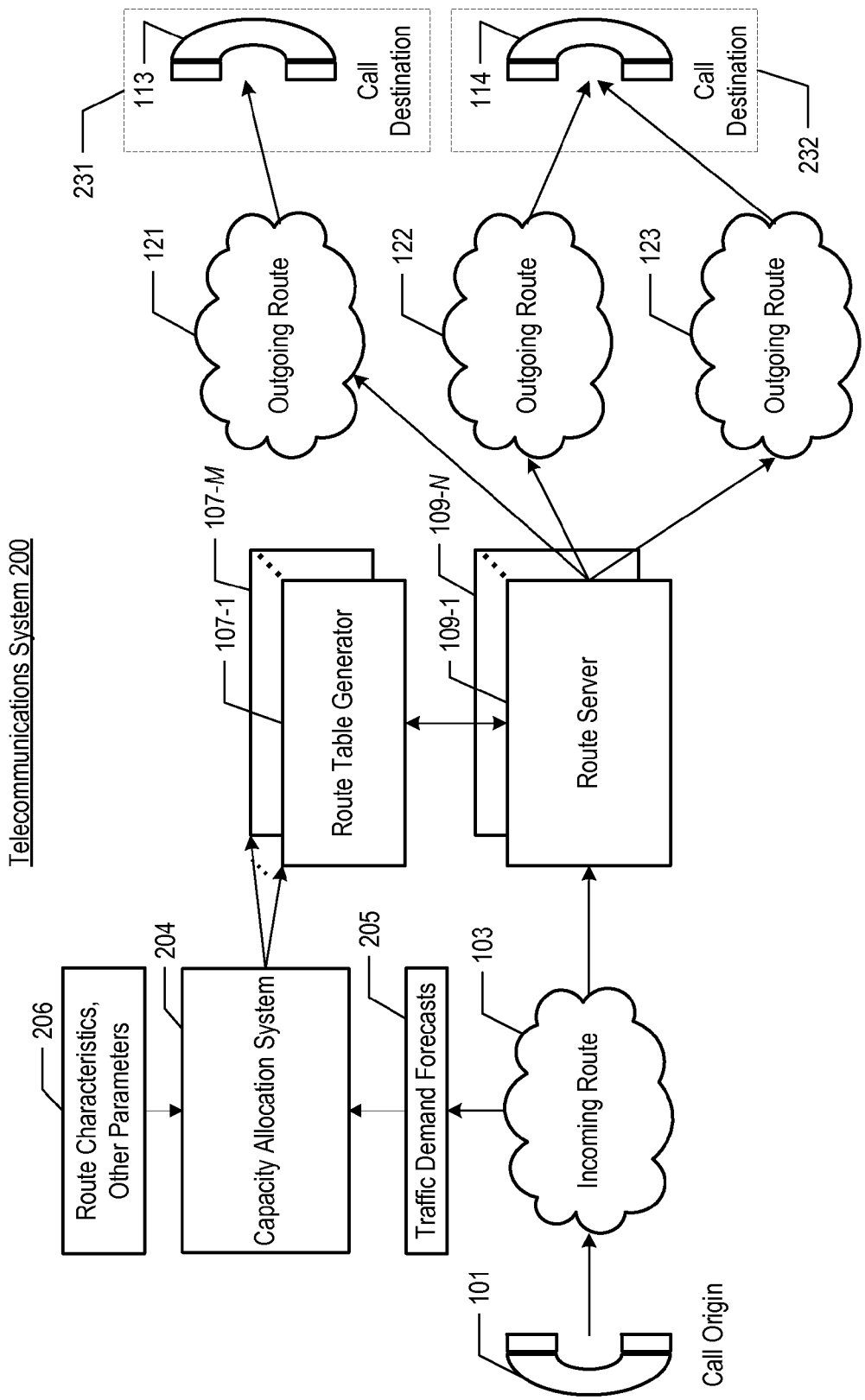
FIG. 2 depicts a schematic diagram of some salient elements of telecommunications system 200 according to an illustrative embodiment of the present invention.

FIG. 2 depicts a schematic diagram of some salient elements of telecommunications system 200 according to an illustrative embodiment of the present invention. Telecommunications system 200 comprises: call origin 101; incoming route 103; a source of traffic demand forecasts 205; a source of route characteristics (or corresponding supplier facility characteristics) 206; capacity allocation system 204; route table generators 107-1 through 107-M, wherein M is a positive integer; route servers 109-1 through 109-N, wherein N is a positive integer; outgoing routes 121, 122, and 123; and call destinations 113 and 114, which are interconnected within telecommunications system 200 as shown.

Figure 1A:
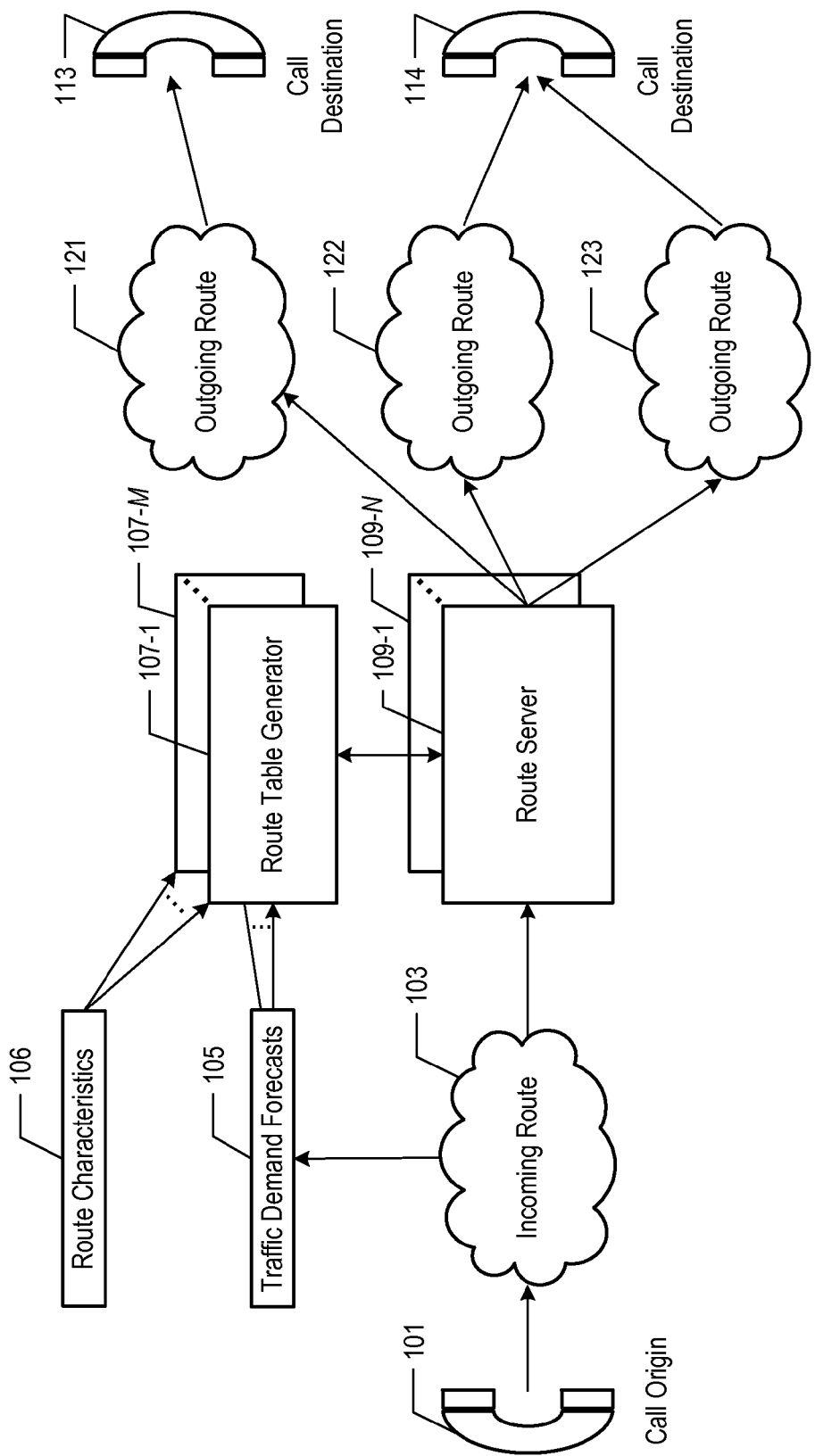
FIG. 1A depicts a schematic diagram of a portion of telecommunications system 100 that is typical in the prior art.
Figure 1B:
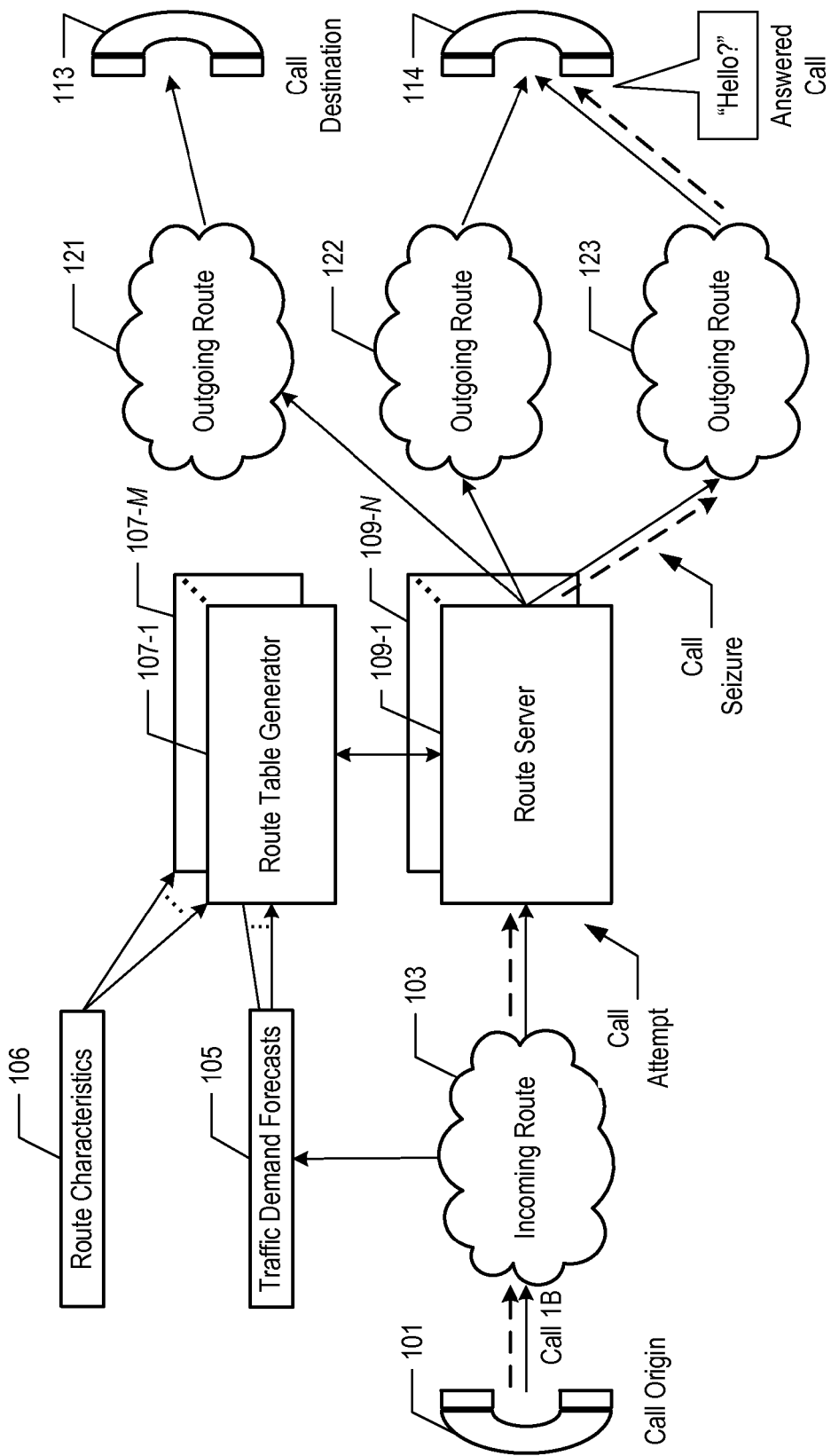
FIG. 1B depicts a more detailed schematic diagram of a portion of prior-art telecommunications system 100 depicted in FIG. 1A, including call 1B being routed to and answered at call destination 114.

At least some of the components of telecommunications system 200 were described above and in FIG. 1A. To the extent that a component appearing in FIG. 1A is described again here, it is for purposes relevant to FIG. 2 or for additional emphasis.

Capacity allocation system 204 (or "allocation system 204") performs the capacity allocation of the illustrative embodiment, by coordinating and executing the operations of method 400 described herein. System 204 is described in further detail below and in the accompanying figures.

Traffic demand forecasts 205 are stored in one or more data structures, and comprise predicted telecommunications traffic data for one or more periods of time, for one or more call destinations. Traffic demand forecasts are calculated based on prediction algorithms, for each time period (e.g., hour or any other suitable period of time, etc.) and reflect i) "normal" demand defined as the predicted traffic that is expected in the next time period and ii) "buffer" demand defined as an additional margin of excess traffic above and beyond the normal demand and applicable to the next time period. For example and without limitation, traffic demand forecasts 205 comprise, per call destination in a given period of time, the number of predicted calls. Traffic demand forecasts 205 may be stored in a component of capacity allocation system 204 or in a stand-alone component, or may be supplied by an outside system, or a combination thereof, etc., without limitation.

Route characteristics 206 are stored in one or more data structures, and comprise information about any facilities and outgoing routes that emanate from route server 109, as well as other input parameters to be used by capacity allocation system 204. For example and without limitation, route characteristics 206 comprise the call capacity of each available outgoing route and/or outgoing facility (i.e., "call-termination device") that emanate from route servers 109 typically measured in calling minutes available per hour; historical information about the routes/facilities, such as maintenance periods when a facility or route might be completely unavailable; and other historical performance data such as failure rates that measure the reliability of the route/facility. Route characteristics 206 may be stored in a component of capacity allocation system 204 or in a stand-alone component, or may be supplied by an outside system, or a combination thereof, etc., without limitation.

Route table generator 107-$m$ (or "table generator 107") is based on a processor or data-processing system or other computing platform. Route table generator 107 receives capacity allocations from allocation system 204 and, based on these and other data, generates one or more route tables for the use of route server 109.

Route server 109-$n$ (or "server 109") is based on a processor, data-processing system, computing platform, call-processing system, or call-switching platform. Route server 109 may be co-resident with route table generator 107 or may be a separate component from route table generator 107. Notably, route server 109 is responsible for handling a call, i.e., processing a call arriving from an incoming route and, based on the contents of the route table generated by route-table generator 107, placing it on an available outgoing route or corresponding facility (if any), but route server 109 is not responsible for handling the call after egress from the route server.

According to the illustrative embodiment, route table generator 107 and route server 109 are distinct components of telecommunications system 200. However, it will be clear to those having ordinary skill in the art, after reading the present disclosure, how to make and use alternative embodiments of the present invention, wherein route table generator 107 and route server 109 are co-resident on the same hardware platform, or form a single integrated component, or are otherwise combined. It will be further clear to those having ordinary skill in the art, after reading the present disclosure, how to make alternative embodiments wherein elements 107, 109, and 204, are embodied in a single multi-functional integral component, or are differently combined or sub-divided than shown herein.

Call destinations 113 and 114 each represents a termination point where a call can be answered, such as a telephone, a mobile station, a computer, a switch, an answering machine, an incoming voice-response system, etc., without limitation. A call destination can be represented by any suitable addressing scheme such as a dialed number, a "Dialed Number Identification Service" ("DNIS"), a "Uniform Resource Locator" ("URL"), or a data endpoint address, a country code, or a city code, or an area code, or a combination thereof, etc., without limitation.

Call destinations 113 and 114 are situated in geographic regions 231 and 232, respectively. In some alternative embodiments of the present invention, call destinations 113 and 114 are situated in the same geographic region (e.g., United States, New Jersey, "rest-of-world", Europe, India, etc.).

Each call destination has associated with it at least one service level. The different service levels reflect different service "offers" (e.g., marketing offers, etc.) to subscribers. For the purposes of this specification, a particular combination of call destination and service level is referred to as "call destination/service level."

Although the present figure depicts only one call origin 101 and one incoming route 103, it will be clear to those having ordinary skill in the art, after reading the present disclosure, how to make alternative embodiments of telecommunications system 200 with any number of call origins and any number of incoming routes handling any number of incoming call attempts. Likewise, although the present figure depicts only three outgoing routes 121 through 123, two call destinations 113 and 114, and two geographic regions 231 and 232, it will be clear to those having ordinary skill in the art, after reading the present disclosure, how to make alternative embodiments of telecommunications system 200 with any number of outgoing routes and any number of call destinations in any number of geographic regions.

Figure 3:
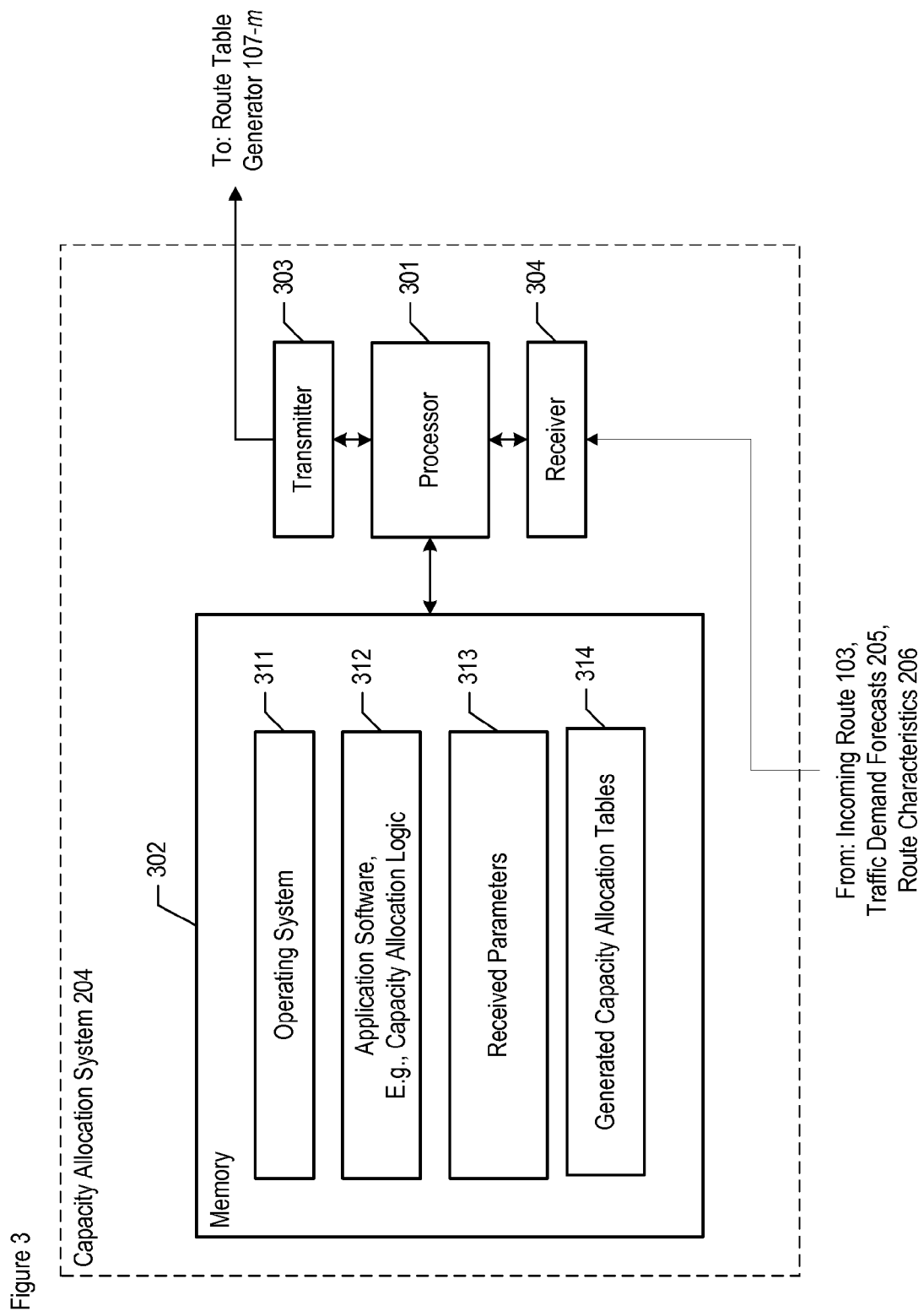
FIG. 3 depicts a schematic diagram of the hardware platform for capacity allocation system 204 according to the illustrative embodiment.

FIG. 3 depicts a schematic diagram of the hardware platform for capacity allocation system 204 according to the illustrative embodiment. According to the illustrative embodiment, capacity allocation system 204 is based on a data-processing apparatus whose hardware platform comprises: processor 301, memory 302, transmitter 303 and receiver 304.

Processor 301 is a processing device, such as a microprocessor. Processor 301 is configured such that, when operating in conjunction with the other components of capacity allocation system 204, processor 301 executes software, processes data, and telecommunicates according to the operations described herein.

Memory 302 comprises non-transitory and non-volatile computer storage memory technology, e.g., flash, RAM, etc. Memory 302 stores operating system 311, application software 312, element 313, and element 314. The specialized application software 312 that is executed by processor 301 is illustratively denominated the "capacity allocation logic" that enables capacity allocation system 204 to perform the operations of method 400. Memory element 313 illustratively comprises received parameters, including traffic demand forecasts (e.g., from traffic demand forecasts 105), route characteristics and historical performance data (e.g., from route characteristics 106), as well as other input parameters. Memory element 313 also comprises other data, records, results, lists, associations, indicators, whether of an intermediate nature, final results, or archival. The generated capacity allocation tables that are to be transmitted to some or all of route table generators 107-1 through 107-M are illustratively stored in memory element 314.

It will be clear to those having ordinary skill in the art how to make and use alternative embodiments that comprise more than one memory 302; or comprise subdivided segments of memory 302; or comprise a plurality of memory technologies that collectively store operating system 311, application software 312, and elements 313 and 314.

Transmitter 303 is a component that enables capacity allocation system 204 to telecommunicate with other components and systems by transmitting signals that convey information thereto (e.g., messages containing capacity allocation data, data packets, etc.). For example, transmitter 303 enables telecommunication pathways to route table generators 107-1 through 107-M, other systems (not shown), display(s) (not shown), etc. without limitation. It will be clear to those having ordinary skill in the art how to make and use alternative embodiments that comprise more than one transmitter 303. Transmitter 303 is shown in a wired configuration, but in some alternative embodiments, transmitter 303 may telecommunicate wirelessly.

Receiver 304 is a component that enables capacity allocation system 204 to telecommunicate with other components and systems by receiving signals that convey information therefrom (e.g., messages containing route characteristics and/or traffic demand forecasts, data packets, etc.). For example, receiver 304 enables telecommunication pathways from traffic predictions 205, route characteristics 206, and other systems (not shown), display(s) (not shown), etc. without limitation. It will be clear to those having ordinary skill in the art how to make and use alternative embodiments that comprise more than one receiver 304. Receiver 304 is shown in a wired configuration, but in some alternative embodiments, receiver 304 may telecommunicate wirelessly.

It will be clear to those skilled in the art, after reading the present disclosure, that in some alternative embodiments the hardware platform of capacity allocation system 204 can be embodied as a multi-processor platform, as a sub-component of a larger computing platform, as a virtual computing element, or in some other computing environment—all within the scope of the present invention. It will be clear to those skilled in the art, after reading the present disclosure, how to make and use the hardware platform for capacity allocation system 204.

Figure 4:
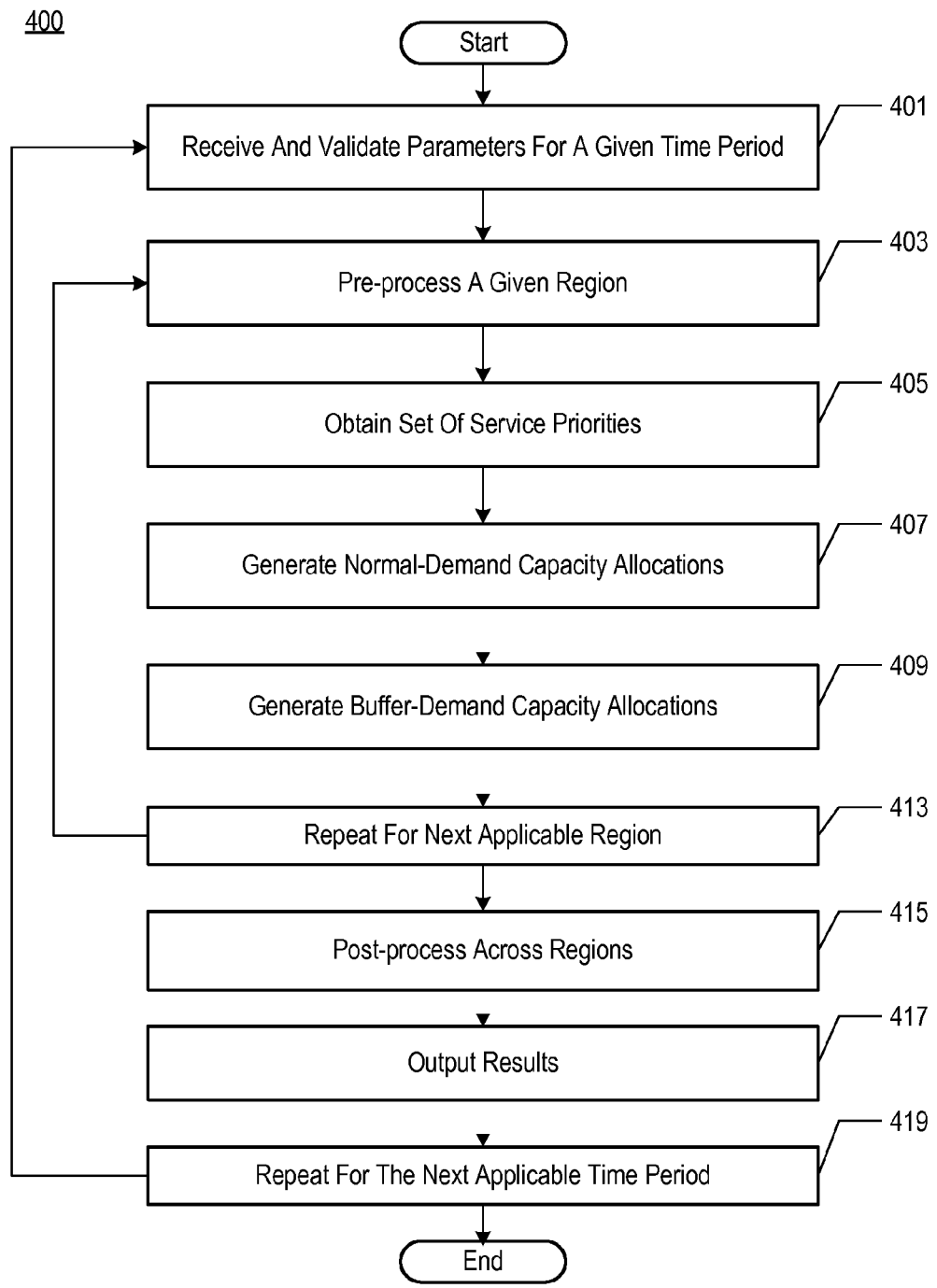
FIG. 4 depicts some salient operations of method 400 according to the illustrative embodiment.

FIG. 4 depicts some salient operations of method 400 according to the illustrative embodiment. Capacity allocation system 204 is the entity within illustrative telecommunications system 200 that executes and coordinates the operations of method 400 according to the illustrative embodiment of the capacity allocation logic.

At operation 401, capacity allocation system 204 receives and validates parameters for the current time period being processed, e.g., for the upcoming hour or any other suitable period. Operation 401 is described in more detail below and in FIG. 5.

At operation 403, capacity allocation system 204 pre-processes call-termination devices within the current geographic region being processed. Operation 403 is described in more detail below and in FIG. 6.

At operation 405, capacity allocation system 204 obtains a non-empty set of service priorities attributed to one or more call destinations. Operation 405 is described in more detail below and in FIG. 7.

At operation 407, capacity allocation system 204 generates one or more capacity allocation solutions for normal demand, for the geographic region currently being processed. Operation 407 is described in more detail below and in FIG. 8A.

At operation 409, capacity allocation system 204 generates one or more capacity allocation solutions for buffer demand, for the geographic region currently being processed. Operation 409 is described in more detail below and in FIG. 9A.

At operation 413, capacity allocation system 204 passes control back to operation 403 to repeat the aforementioned operations for the next applicable geographic region.

At operation 415, capacity allocation system 204 performs post-processing in order to allocate any remaining capacity of one or more call-termination devices, among other reasons. Operation 403 is described in more detail below and in FIG. 10.

At operation 417, capacity allocation system 204 outputs the results of the capacity allocation process. Operation 403 is described in more detail below and in FIG. 11.

At operation 419, capacity allocation system 204 passes control back to operation 401 to repeat the aforementioned operations for the next applicable time period, e.g., the hour that follows the present given time period. It will be clear to those having ordinary skill in the art, after reading the present disclosure, how to make and use alternative embodiments of the present invention wherein method 400 is not limited to an upcoming fixed time period, such that the repetitive loop illustrated by operation 419 is eliminated in whole or in part. The present invention is not limited to an hourly or periodic execution of method 400 in preparation for an upcoming time period; a more flexible approach could be implemented by those having ordinary skill in the art, after reading the present disclosure.

In regard to method 400, it will be clear to those having ordinary skill in the art, after reading the present disclosure, how to make and use alternative embodiments of method 400 wherein the recited operations and sub-operations are differently sequenced, grouped, or sub-divided—all within the scope of the present invention. For example and without limitation, at least some of the capacity for buffer demand might be allocated before all of the capacity for normal demand has been allocated, for a given geographic region. It will be further clear to those skilled in the art, after reading the present disclosure, how to make and use alternative embodiments of method 400 wherein some of the recited operations and sub-operations are optional, are omitted, or are executed by other elements and/or systems.

Figure 5:
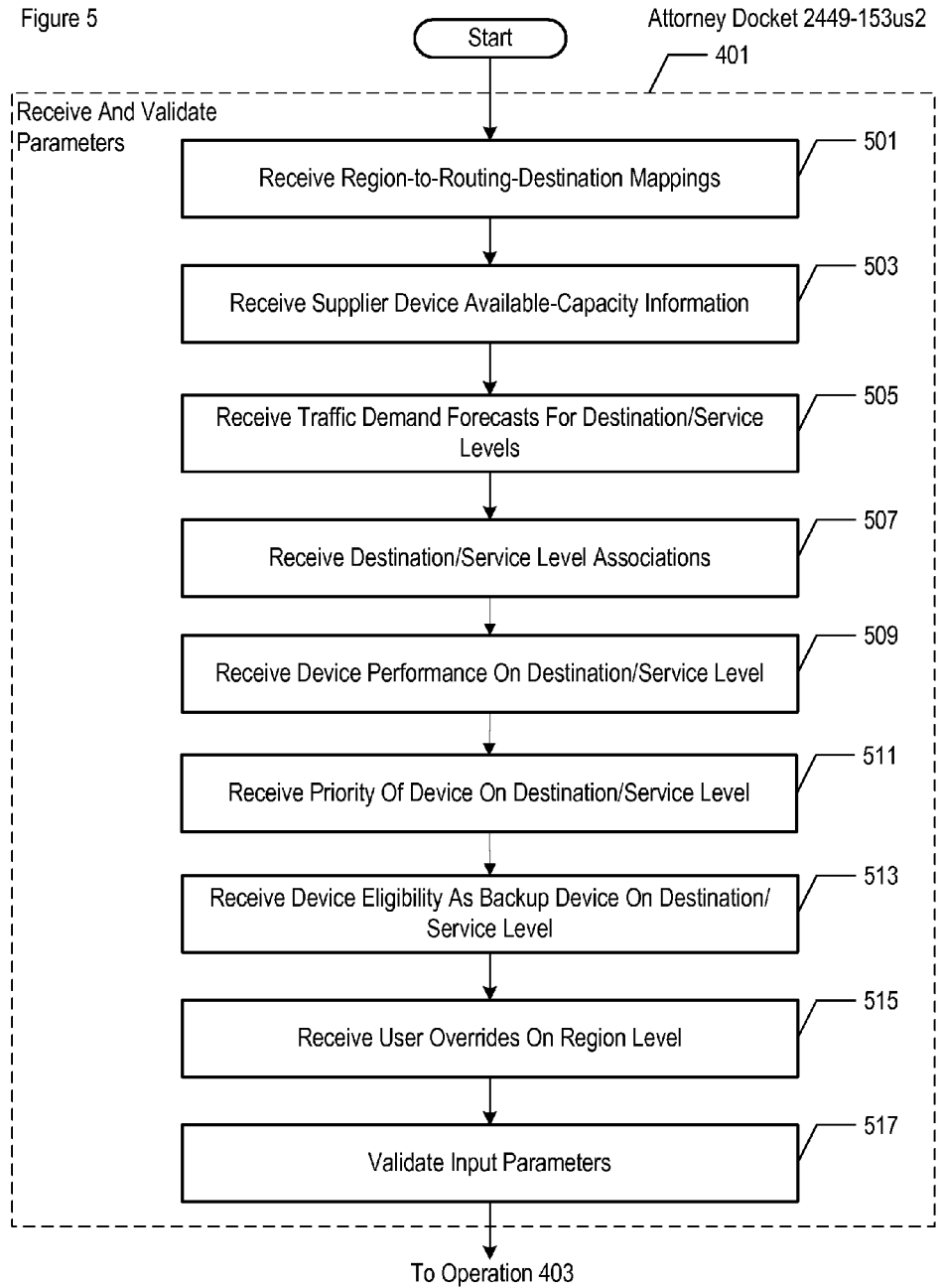
FIG. 5 depicts some salient sub-operations of operation 401 according to the illustrative embodiment.

FIG. 5 depicts some salient sub-operations of operation 401 according to the illustrative embodiment.

At operation 501, capacity allocation system 204 receives one or more parameters representing regions-to-routing destination mapping, in which each region (e.g., United States, New Jersey, "rest-of-world", Europe, India, etc.) is further divided into routing destinations. This input parameter identifies the association between each region and its call destinations.

At operation 503, capacity allocation system 204 receives one or more parameters representing available call-capacity information of the suppliers' devices. This input parameter identifies the suppliers and their call-termination devices, along with the available call-carrying capacity that can be utilized towards fulfilling a region's traffic demand, for each device.

At operation 505, capacity allocation system 204 receives one or more parameters representing traffic demand forecasts for each call destination, typically represented in terms of each call destination/service level. This is the projected traffic demand for the next hour (or any other suitable period) for each call destination/service level and corresponds to traffic demand forecasts 205, as described earlier.

At operation 507, capacity allocation system 204 receives one or more input parameters representing call-destination/service level (SL) associations, comprising one or more of the following:
  a) Service priority of call-destination/service level—Each service level (i.e., marketing "offer") has an associated service priority. Similarly, each call-destination/SL has an associated service priority. This input parameter indicates the service priority of each call-destination/SL. As discussed below, the technique of the illustrative embodiment first allocates device capacity towards fulfilling the demand of the highest-priority call-destination/SL, followed by the second-highest priority call-destination/SL, and so on. Notably, one or more call-destination/SLs can be assigned a given service priority.
  b) Minimum suppliers per call-destination/service level— This input parameter specifies the number of minimum suppliers that should have their capacity allocated for a call-destination/SL. This input can be used in order to avoid real time outages that would occur, for example, if only one supplier had been allocated and is out of service in real time.
  c) Minimum percentage of devices of a supplier—Each supplier has one or more call-termination devices. A user (e.g., route manager, technician, etc.) can specify the minimum number of call-termination devices of a supplier that are to be used for a call destination/SL.

At operation 509, capacity allocation system 204 receives one or more parameters representing device performance (MPA) (e.g., on a call destination/service level basis). This is the predicted performance of call-termination devices hypothetically assigned to a call destination/SL for the next hour (or any other suitable period), based on the historical performance.

At operation 511, capacity allocation system 204 receives one or more parameters representing the priority (high/low) of a device on a destination/service level basis. This is a system-generated input to associate a call-termination device as a high-priority or low-priority device (e.g., for a call destination/SL, etc.). A high-priority device is a call-termination device that is normally used to terminate traffic on a call destination/SL. But in the event that a high-priority device is experiencing an outage condition or is not capable of taking any traffic in real time, then low-priority devices act as backups for the overflow traffic.

At operation 513, capacity allocation system 204 receives one or more parameters representing a device's eligibility as a backup device (e.g., on a destination/service level basis, etc.). This input parameter designates a call-termination device as being eligible to take up overflow traffic.

At operation 515, capacity allocation system 204 receives one or more parameters representing user overrides (e.g., on a geographic region basis, etc.). A user (e.g., route manager, technician, etc.) can specify the contribution of call-termination device capacity towards a region's demands. These are entered by the user as the following overrides:
  a) "equal-to"—The user can specify an allocation equal to a certain percentage of a device's capacity, in which the allocation can be specified for each of one or more regions.
  b) "at-least"—user can specify allocation of at least a certain percentage of a device's capacity, to a region.
  c) "at-most"—user can specify allocation of at most a certain percentage of a device's capacity, to a region.

At operation 517, capacity allocation system 204 validates the input parameters, in well-known fashion.

Figure 6:
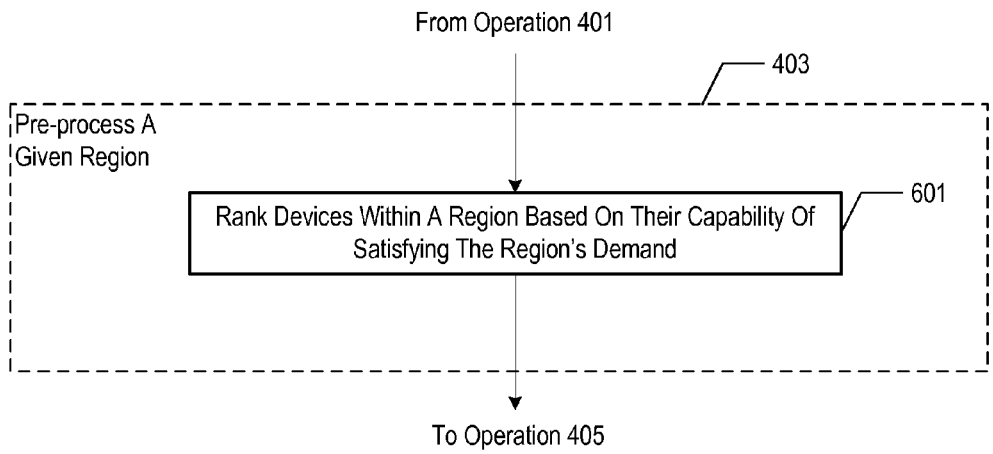
FIG. 6 depicts some salient sub-operations of operation 403 according to the illustrative embodiment.

FIG. 6 depicts some salient sub-operations of operation 403 according to the illustrative embodiment.

At operation 601, capacity allocation system 204 ranks call-termination devices within a region, based on their capability of satisfying the region's demand. The rationale is explained here. In at least some embodiments of the present invention, it is a requirement that call destination/service levels be satisfied according to their service priorities and capacity available for them. Though not a requirement in all embodiments of the present invention, in some embodiments it is a requirement that normal traffic demand of all the call destination/service levels must be considered before buffer traffic demand of any call destination/service level. Though not a constraint in all embodiments of the present invention, in some embodiments it is not possible to satisfy the buffer demand of a call destination/service level when its normal demand is unmet. To account for all of the above-mentioned considerations, call-termination devices are ranked within a geographic region in accordance with the illustrative embodiment, based on their capability of satisfying demand of the region. In other words, those devices that are allocable to the region are ranked. In some embodiments of the present invention, only those devices that are allocable to the region are ranked. In some alternative embodiments of the present invention, capacity allocation system 204 might perform ranking according to a different set of criteria or might not perform ranking at all.

Figure 7:
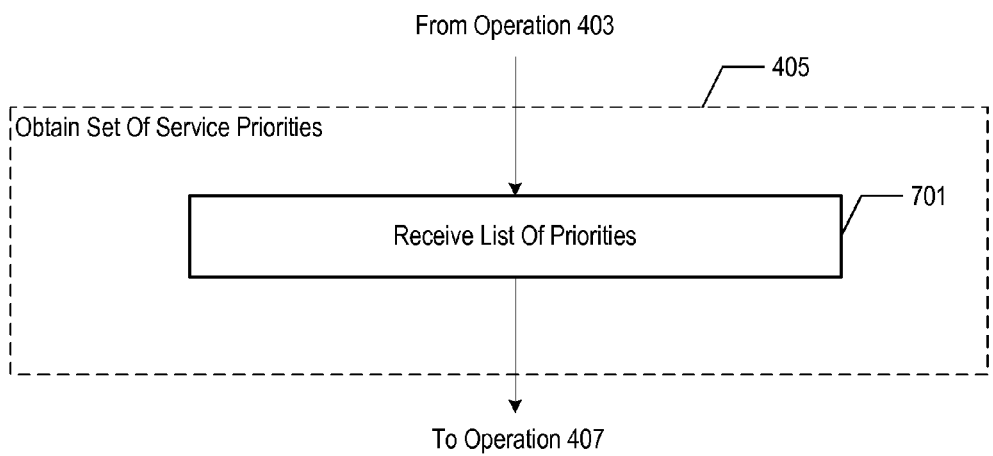
FIG. 7 depicts some salient sub-operations of operation 405 according to the illustrative embodiment.

FIG. 7 depicts some salient sub-operations of operation 405 according to the illustrative embodiment. At operation 701, capacity allocation system 204 receives a list of service priorities attributed to one or more call destinations and derived, at least in part, from what was received at operation 507. The list reflects a prioritization of the service levels across all of the call destinations belonging to the geographic region that is currently being processed. In particular, all of the call destination/service levels that are associated with a first-level (highest level) service priority are grouped together, followed next in the list by all of the call destination/service levels associated with a second-level service priority, and so on.

Figure 8A:
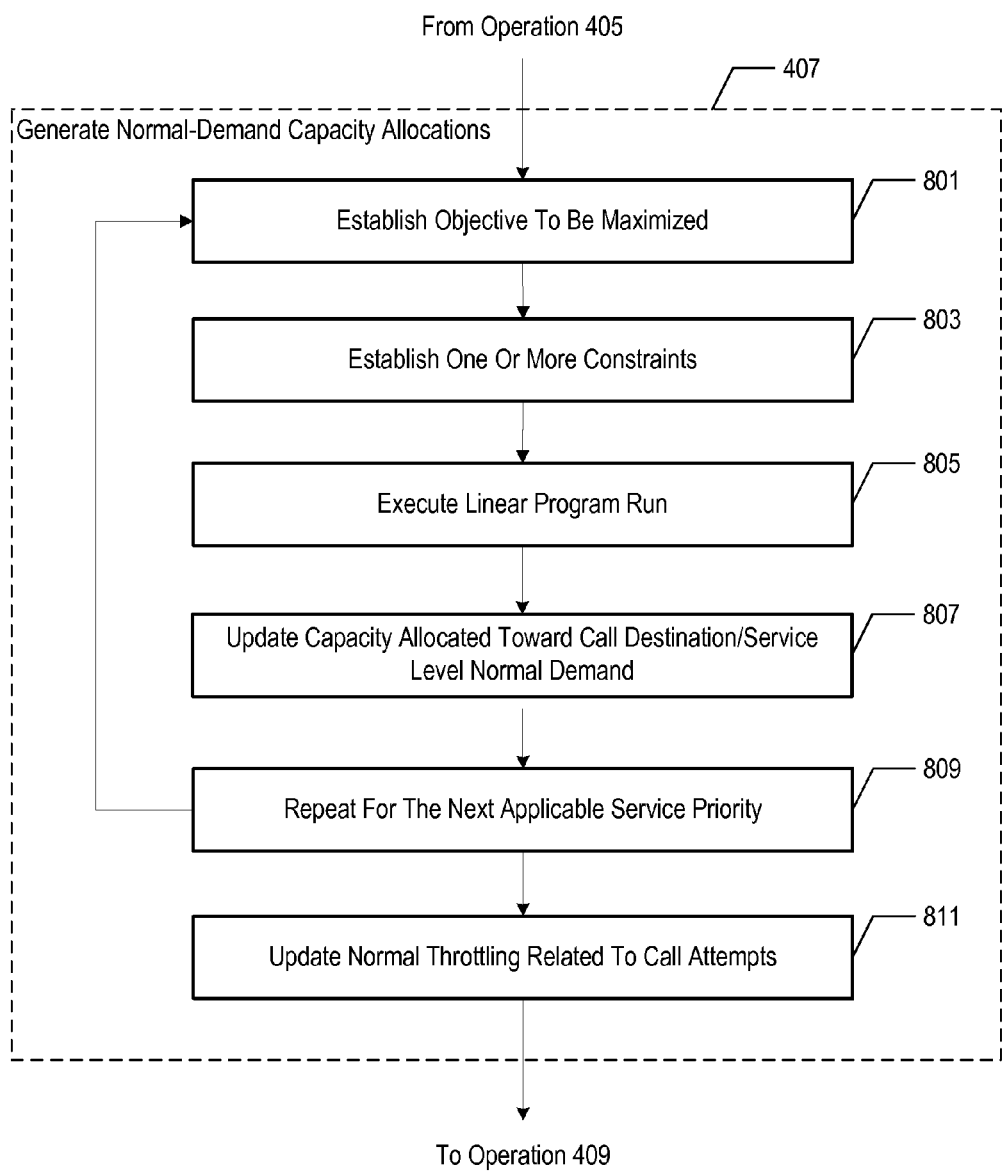
FIG. 8A depicts some salient sub-operations of operation 407 according to the illustrative embodiment.
Figure 9A:
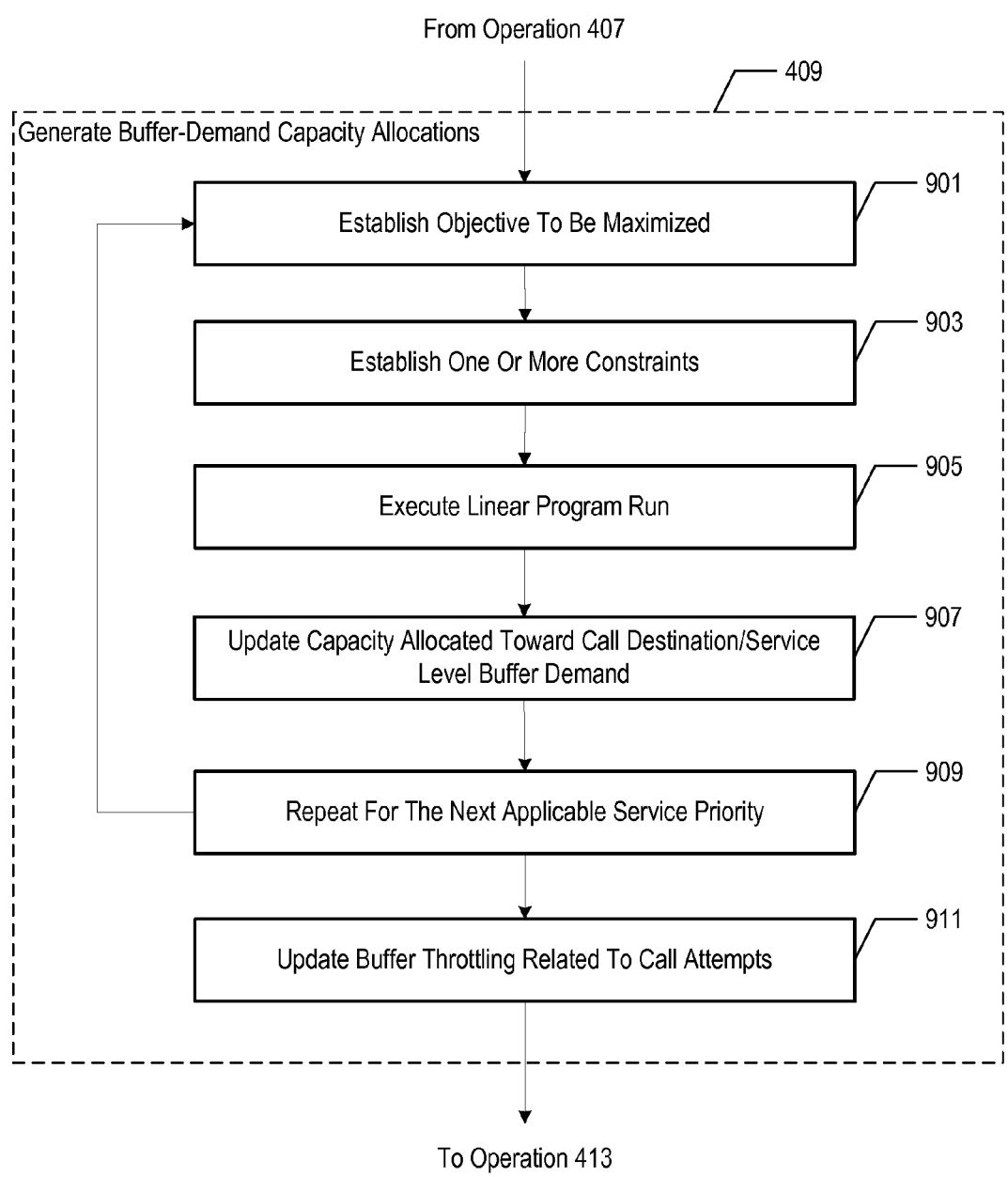
FIG. 9A depicts some salient sub-operations of operation 409 according to the illustrative embodiment.

FIGS. 8A and 9A depict some salient sub-operations of operations 407 and 409, respectively, according to the illustrative embodiment. At operations 407 and 409, capacity allocation system 204 generates a capacity allocation based on normal traffic demand forecasts and a capacity allocation based on buffer traffic demand forecasts, respectively. Because the illustrative embodiment generates capacity allocations based on linear programming techniques, the present operation accordingly establishes the objective(s) to be maximized and the relevant constraints to apply to the execution of each linear programming run.

Although the illustrative embodiment generates a capacity allocation based on linear programming that uses the objective and constraints set forth below, it will be clear to those having ordinary skill in the art, after reading the present disclosure, how to make and use alternative embodiments wherein the objective and/or the constraints differ while still remaining within the scope of the present invention. Likewise, it will be further clear to those having ordinary skill in the art, after reading the present disclosure, how to make and use alternative embodiments that generate the capacity allocations without using linear programming techniques.

FIG. 8A depicts some salient sub-operations of operation 407 according to the illustrative embodiment—that is, to generate a normal-demand capacity allocation. In accordance with the illustrative embodiment, the processing described below is applied first to the highest service priority in the list obtained at operation 701 and is then applied to each successive service priority, in order of priority.

At operation 801, capacity allocation system 204 establishes the objective to be maximized. In accordance with the illustrative embodiment, the objective is to maximize capacity allocation of one or more call-termination devices, in order to fulfill the demands of the geographic region currently being processed.

At operation 803, capacity allocation system 204 establishes one or more constraints. Operation 803 is described in more detail below and in FIG. 8B.

Figure 8B:
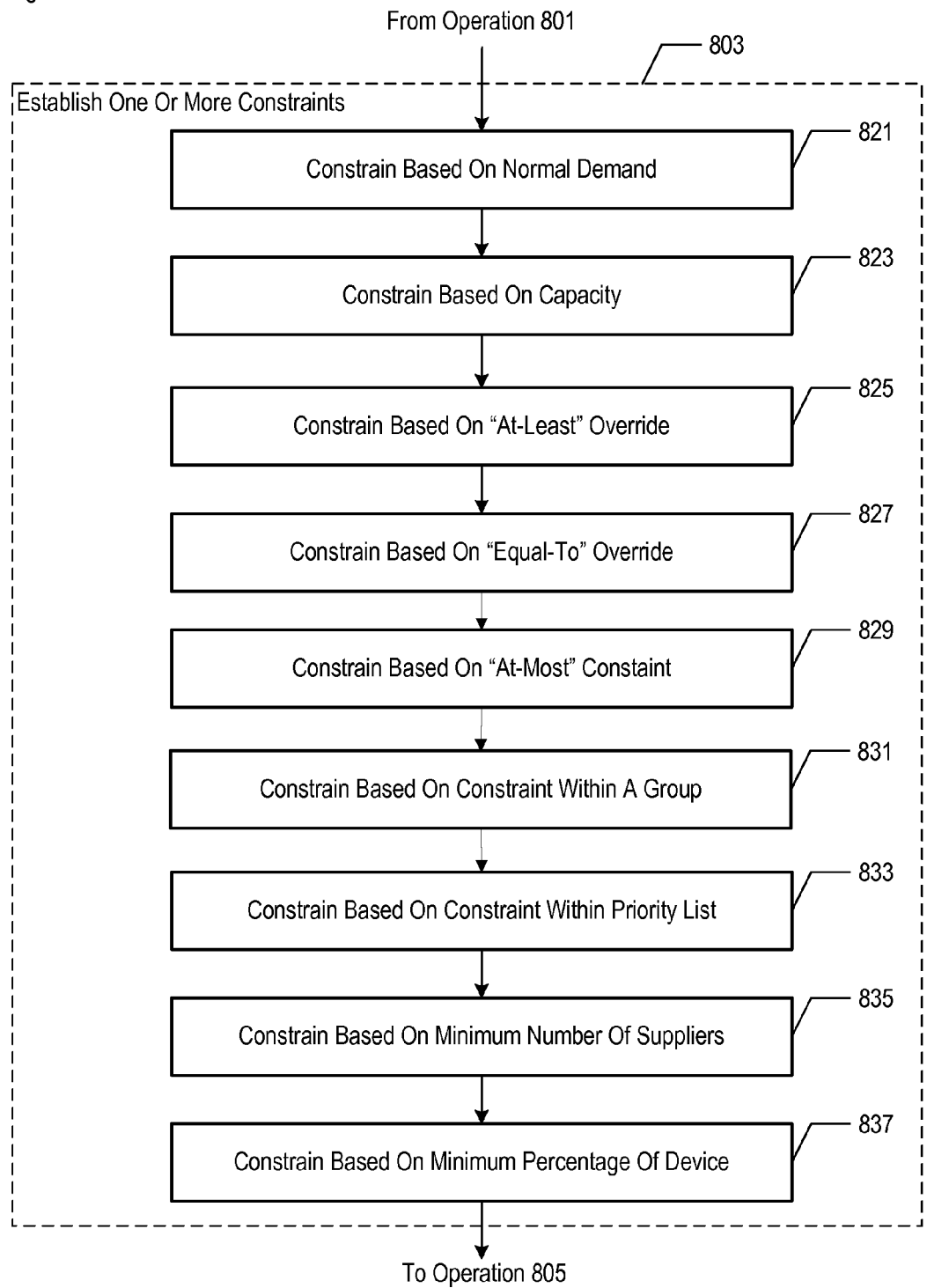
FIG. 8B depicts some salient sub-operations of operation 803 according to the illustrative embodiment.

Referring to FIG. 8B at operation 821, capacity allocation system 204 constrains the linear program based on the normal traffic demand forecasts received at operation 505. In particular, the sum of the capacity allocations from all the call-termination devices to a call destination/service level is to be compared to (e.g., is to be less than, etc.) its demand. In applying this constraint, the capacity allocation becomes based on comparing i) the sum of capacity allocations from all the call-termination devices to a service level associated with a call destination, to ii) the traffic demand forecast for the call destination, in some embodiments of the present invention.

At operation 823, capacity allocation system 204 constrains the linear program based on the capacity of one or more call-termination devices, wherein the capacity information had been received at operation 503. In particular, the sum of the capacity allocations from a call-termination device to all of the call destination/service levels that it will serve is to be compared to (e.g., is to be less than, etc.) the device's capacity.

At operation 825, capacity allocation system 204 constrains the linear program based on the "at-least" user override received at operation 515. This is reverse constraint, in that the sum of the capacity allocations from a call-termination device to call destination/service levels of other geographic regions is to be compared to (e.g., is to be less than, etc.) the expression (100-override value), wherein the override value is expressed as a percentage.

At operation 827, capacity allocation system 204 constrains the linear program based on the "equal-to" user override received at operation 515. Two sub-constraints apply:

a) The sum of the capacity allocation from the call-termination device to all call destination/service levels of the geographic region currently being evaluated is to be compared to (e.g., is to be less than, etc.) the override value.

b) This is a reverse constraint, in that the sum of the capacity allocation from the call-termination device to the call destination/service levels of other geographic regions is to be compared to (e.g., is to be less than, etc.) the expression (100-override value), wherein the override value is expressed as a percentage.

At operation 829, capacity allocation system 204 constrains the linear program based on the "at-most" user override received at operation 515. The sum of the capacity allocation from the call-termination device to the call destination/service levels of the region is to be compared to (e.g, is to be less than, etc.) override value.

At operation 831, capacity allocation system 204 constrains the linear program based on achieving, for a given service priority, equal satisfaction within a group of one or more call destination/service levels having the same service priority, wherein the relevant parameters had been received at operation 507. In particular, all destination/service levels within the same service priority are to be equally satisfied. This constraint is applied, in order to minimize the difference between the highest and lowest demand satisfaction within the group.

At operation 833, capacity allocation system 204 constrains the linear program based on achieving, for a given service priority, equal satisfaction within the same priority list, wherein the relevant parameters had been received at operation 507. This constraint is generated to minimize the difference between the highest and lowest demand satisfaction within the same priority list.

At operation 835, capacity allocation system 204 constrains the linear program based on a minimum supplier constraint, wherein the relevant parameters had been received at operation 507. The number of suppliers used towards fulfilling the demands of a call destination/service level is to be compared to (e.g., is to be greater than or equal to, etc.) the input parameter of minimum suppliers per call destination/service level.

At operation 837, capacity allocation system 204 constrains the linear program based on a minimum device constraint, wherein the relevant parameters had been received at operation 507. The percentage of call-termination devices of a supplier that are used towards fulfilling the demands of a call destination/service level is to be compared to (e.g., is to be greater than or equal to, etc.) the input parameter of minimum percentage of devices.

Now returning to FIG. 8A at operation 805, capacity allocation system 204 executes a linear programming run that generates the capacity allocation based on the objective established at operation 801 and subject to the constraints established at operation 803.

At operation 807, capacity allocation system 204 updates the capacity allocated toward normal-type demands of the call destination/service level under evaluation. In particular, system 204 updates capacity allocation table 1201, as discussed below and in FIG. 12A.

At operation 809, capacity allocation system 204 passes control back to operation 801 to repeat the aforementioned operations for the next applicable service priority.

At operation 811, capacity allocation system 204 updates normal-demand call-throttling information. This occurs when there is no more capacity to allocate—that is, when there are no more devices that are available to terminate the call traffic currently being evaluated. The determination at operation 811 of when and how call throttling is to be applied (i.e., by route table generator 107-$m$ and route server 109-$n$) will be clear to those who are skilled in the art, after reading this specification. Call throttling can be expressed in terms of, for example and without limitation, a percentage or ratio of the traffic demand forecast or in terms of the actual number of call attempts to be throttled in relation to the number of call attempts in the forecast, in a given time period. System 204 updates the call-throttling-related information in capacity allocation table 1202, as discussed below and in FIG. 12B.

FIG. 9A depicts some salient sub-operations of operation 409 according to the illustrative embodiment—that is, to generate a buffer-demand capacity allocation. In accordance with the illustrative embodiment, the processing described below is applied first to the highest service priority in the list obtained at operation 701 and is then applied to each successive service priority, in order of priority.

At operation 901, capacity allocation system 204 establishes the objective to be maximized. In accordance with the illustrative embodiment, the objective is to maximize capacity allocation of one or more call-termination devices, in order to fulfill the demands of the geographic region currently being processed.

At operation 903, capacity allocation system 204 establishes one or more constraints. Operation 903 is described in more detail below and in FIG. 9B.

Figure 9B:
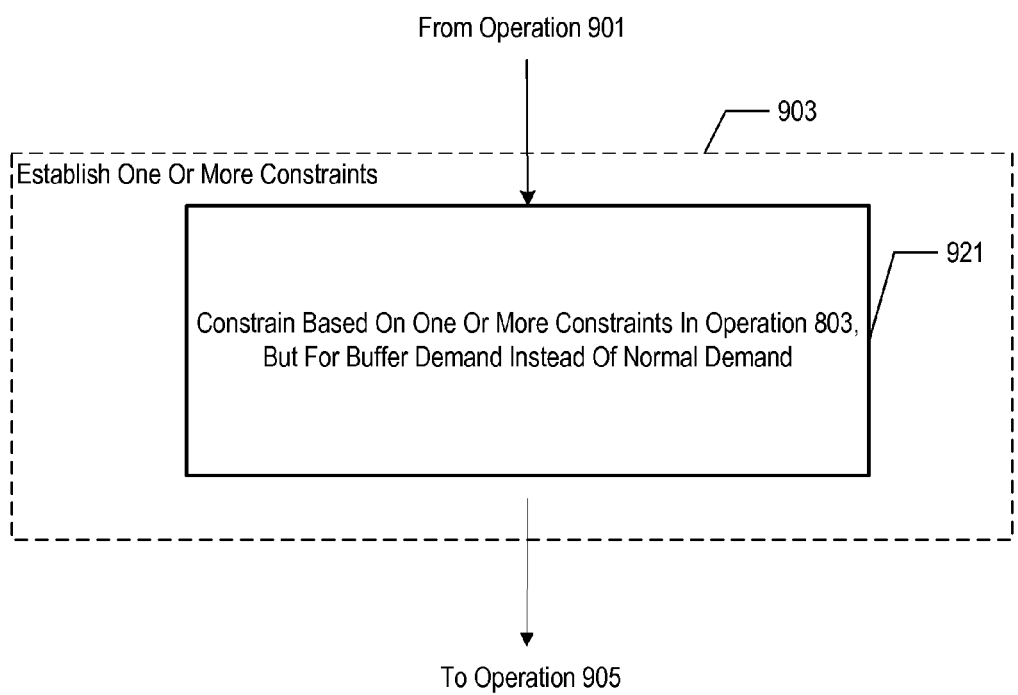
FIG. 9B depicts some salient sub-operations of operation 903 according to the illustrative embodiment.

Referring to FIG. 9B at operation 921, capacity allocation system 204 constrains the linear program based on the buffer traffic demand forecasts and other input parameters received at operation 501 and onwards. Operation 921 comprises functionality identical to that of operations 821 through 837, except that operation 921 pertains to constraints related to buffer demand, instead of normal demand.

Now returning to FIG. 9A at operation 905, capacity allocation system 204 executes a linear programming run that generates the capacity allocation based on the objective established at operation 901 and subject to the constraints established at operation 903, for buffer demand instead of normal demand.

At operation 907, capacity allocation system 204 updates the capacity allocated toward buffer-type demands of the call destination/service level under evaluation. In particular, system 204 updates capacity allocation table 1201, as discussed below and in FIG. 12A.

At operation 909, capacity allocation system 204 passes control back to operation 901 to repeat the aforementioned operations for the next applicable service priority.

At operation 911, capacity allocation system 204 updates buffer-demand call-throttling information. The call throttling that is determined here is the same as that occurring at operation 811, except that buffer demand is considered here instead of normal demand. System 204 updates the call-throttling-related information in capacity allocation table 1202, as discussed below and in FIG. 12B.

Figure 10:
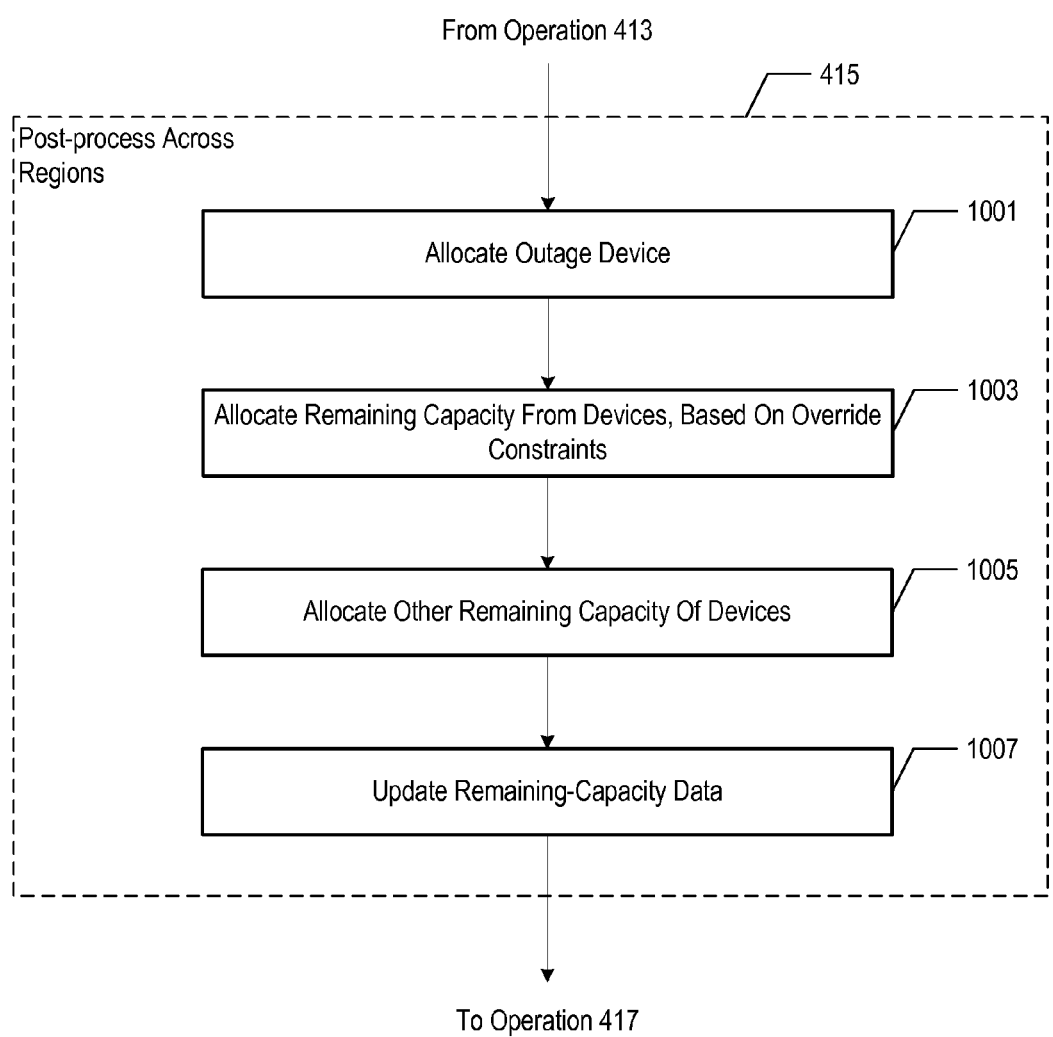
FIG. 10 depicts some salient sub-operations of operation 415 according to the illustrative embodiment.

FIG. 10 depicts some salient sub-operations of operation 415 according to the illustrative embodiment.

At operation 1001, capacity allocation system 204 allocates one or more outage call-termination devices. An "outage" device can be any of the following types:
  a) A device for which no historical dial plan is available, and in which the device is not available and eligible for any of the call destination/service levels. In this case, capacity of the device is divided (e.g., equally, etc.) among all of the geographic regions.
  b) A device that is available and eligible for none of the call destination/service levels. In this case, the capacity of the outage device is divided (e.g., proportionally, etc.) across all of the geographic regions (e.g., on the basis of historical allocation by the device to the region, etc.).

At operation 1003, capacity allocation system 204 allocates the remaining capacity from devices having override constraints of type "at-least" and "equal-to". For call-termination devices having capacity overrides of types "at-least" and "equal-to", the capacity of the device equal to the override is reserved in the LP model. If after all the LP processing is completed the capacity override value is not reached, then in post-processing, the difference between the capacity override value and the already allocated value in the model is allocated to satisfy the constraints of types "at-least" and "equal-to".

At operation 1005, capacity allocation system 204 allocates all remaining capacity of the devices. For example, when call-termination device j has capacity remaining, two cases are possible:
  a) Device j is available and eligible and is used for capacity allocation. In this case, the remaining capacity of a device will be distributed only to those call destination/service levels to which device j allocates, and the allocation will be in proportion of allocation to call destination/service levels from that device.
  b) Device j is available and eligible, but is not used for capacity allocation. There can be many reasons for this, such as an optimal solution having been achieved that satisfies all call destination/service levels without requiring device j. The remaining capacity of a device j will be allocated (e.g., equally, etc.) to the regions for which it is both available and eligible. In some embodiments of the present invention, a device is both available and eligible for a region if it is both available and eligible for at least one call destination/service level in that region.

At operation 1007, capacity allocation system 204 updates the remaining-capacity information. In particular, system 204 updates capacity allocation table 1203, as discussed below and in FIG. 12C, based on the remaining capacity of one or more call-termination devices determined at operations 1001, 1003, and 1005.

Figure 11:
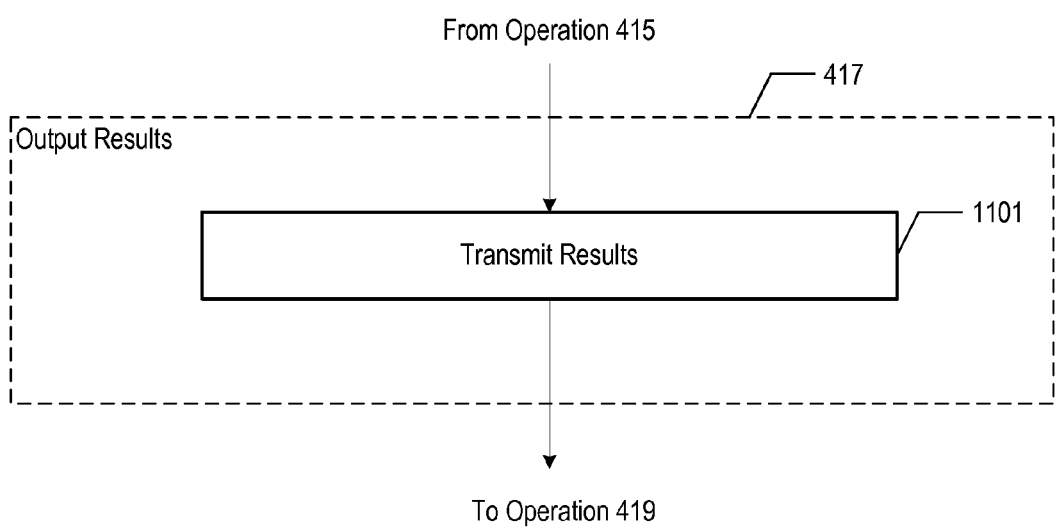
FIG. 11 depicts some salient sub-operations of operation 417 according to the illustrative embodiment.

FIG. 11 depicts some salient sub-operations of operation 417 according to the illustrative embodiment.

At operation 1101, capacity allocation system 204 transmits some or all of the information represented in capacity allocation tables 1201, 1202, and/or 1203, to other systems, and to any relevant displays, and archives as appropriate—according to transmission techniques known to those with skill in the art. Those other systems can include, but are not limited to, route table generators 107-1 through 107-M, route servers 109-1 through 109-N, a system that performs some or all of the functions of both generator 107-$m$ and server 109-$n$, facilities present in outgoing routes 121 through 123, and so on.

In some embodiments, system 204 transmits the aforementioned information for use by one or more applications in i) generating a route table, or ii) selecting outgoing facilities and/or outgoing routes for each of one or more calls, or iii) routing one or more calls, or iv) performing any combination of these functions. In some other embodiments, system 204 uses some or all of the information represented in capacity allocation tables 1201, 1202, and/or 1203, in order to perform one or more of the foregoing functions itself, such as routing one or more calls according to the aforementioned information.

Figure 12A:
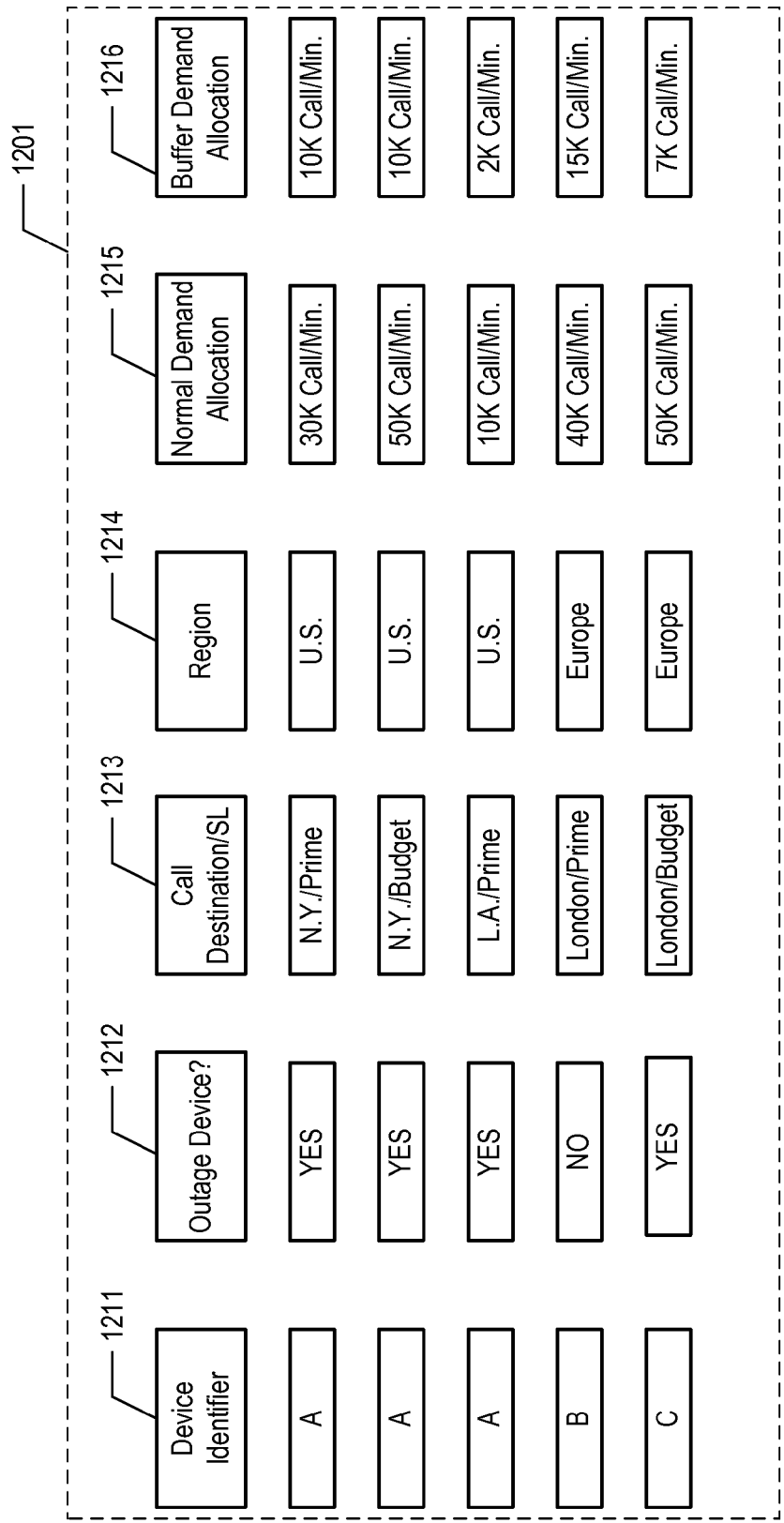
FIG. 12A depicts capacity allocation table 1201 generated according to operations 807 and 907 of the illustrative embodiment.

FIG. 12A depicts capacity allocation table 1201 generated according to operations 807 and 907 of the illustrative embodiment. Table 1201 comprises columns 1211 through 1217.

Column 1211 lists the distinct call-termination devices for the given period of time. Here, call-termination devices A, B, and C are depicted.

Column 1212 lists the outage status of the distinct call-termination devices for the given period of time. Here, call-termination devices A and C are considered outage devices.

Column 1213 lists the distinct call destination/service levels for the given period of time. Here, call destination/SLs "New York/Prime", "New York/Budget", "Los Angeles/Prime", "London/Prime", and "London/Budget" are depicted.

Column 1214 lists the regions across which call capacity is allocated for the given period of time. Here, the U.S. region and the Europe region are depicted.

Column 1215 lists the normal demand capacity allocation for the given period of time. The capacity allocation for the normal demand forecast was determined at operation 807.

Column 1216 lists the buffer demand capacity allocation for the given period of time. The capacity allocation for the buffer demand forecast was determined at operation 907.

An additional column (not depicted) lists the remaining capacity determined to be present, if any, at each call-termination device. How the remaining capacity is divided up across the geographic regions is reflected in table 1203.

Figure 12B:
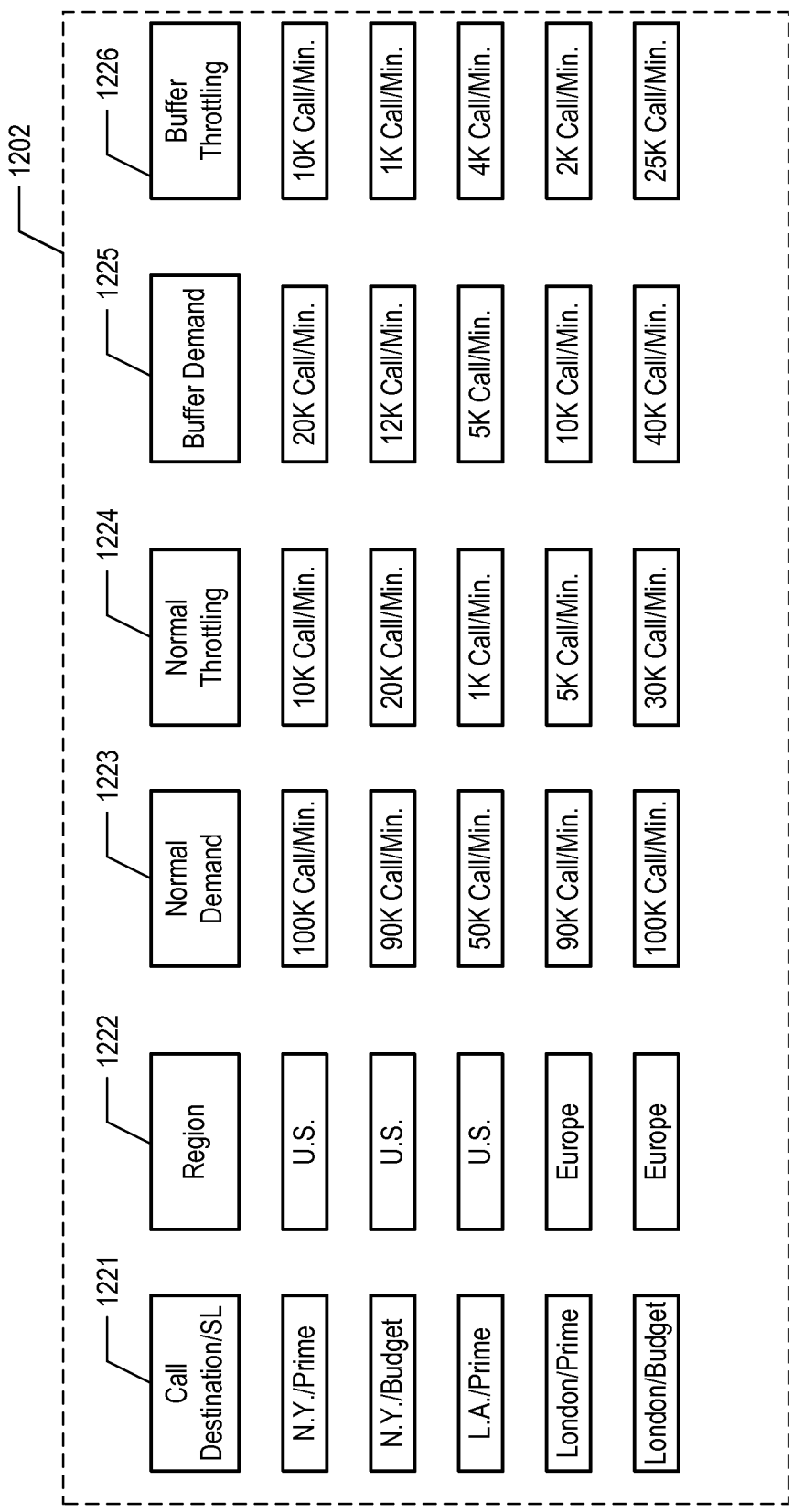
FIG. 12B depicts capacity allocation table 1202 generated according to operations 811 and 911 of the illustrative embodiment.

FIG. 12B depicts capacity allocation table 1202 generated according to operations 811 and 911 of the illustrative embodiment. Table 1202 comprises columns 1221 through 1226.

Column 1221 lists the distinct call destination/service levels for the given period of time. Here, call destination/SLs "New York/Prime", "New York/Budget", "Los Angeles/Prime", "London/Prime", and "London/Budget" are depicted.

Column 1222 lists the regions across which call throttling will be occurring for the given period of time. Here, the U.S. region and the Europe region are depicted.

Columns 1223 and 1224 list the normal demand and call throttling relative to the normal demand. The call throttling of the normal demand was determined at operation 811. As an example, "New York/Prime" will require 10 thousand call attempts to be throttled out of 100 thousand call attempts, in terms of normal demand.

Columns 1225 and 1226 list the buffer demand and call throttling relative to the buffer demand. The call throttling of the buffer demand was determined at operation 911. As an example, "London/Prime" will require two thousand call attempts to be throttled out of 10 thousand call attempts, in terms of buffer demand.

Figure 12C:
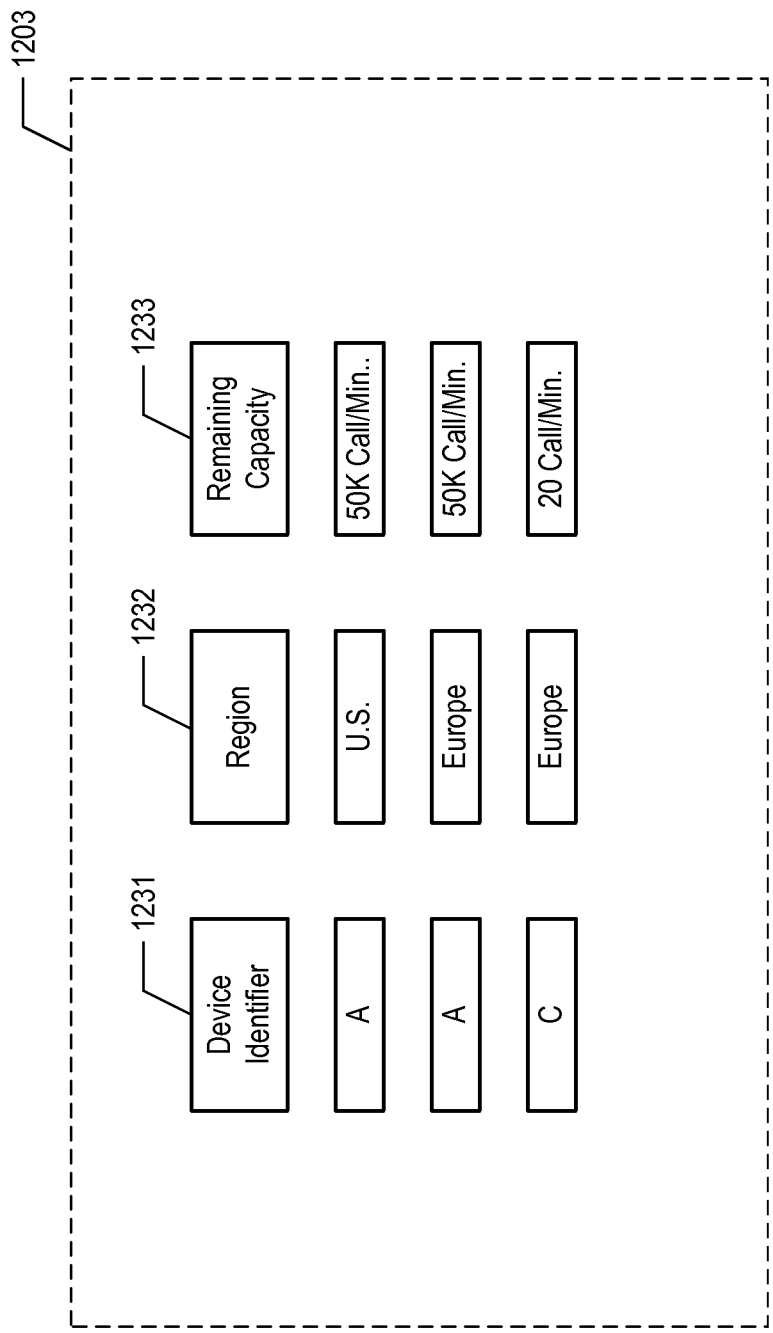
FIG. 12C depicts capacity allocation table 1203 generated according to operation 1007 of the illustrative embodiment.

FIG. 12C depicts capacity allocation table 1203 generated according to operation 1007 of the illustrative embodiment. Table 1203 comprises columns 1231, 1232, and 1233.

Column 1231 lists the distinct call-termination devices for the given period of time. Here, call-termination devices A and C are depicted.

Column 1232 lists the regions across which the remaining capacity is being divided for the given period of time. Here, the U.S. region and the Europe region are depicted.

Column 1233 lists the remaining capacity allocated across the listed regions, for each device listed. Here, device A will accommodate an added 50 thousand calls per minute in the U.S. region and 50 thousand calls per minute in the Europe region. Device C will accommodate an added 20 thousand calls per minute in the U.S. region and 20 thousand calls per minute in the Europe region.

It is to be understood that the present disclosure teaches examples of the illustrative embodiment(s) and that many variations of the invention can be devised by those skilled in the art after reading this disclosure. The scope of the present invention is to be determined by the following claims.

What is claimed is:

1. A method comprising:
   receiving, by a telecommunications system,
      i) a first call-traffic demand forecast for each of a plurality of call destinations within a first geographic region, and
      ii) a non-empty first set of service priorities attributed to the plurality of call destinations;
   generating, by the telecommunications system, a first capacity allocation for each service priority in the first set of service priorities, based on an objective of maximizing capacity allocation of one or more call-termination devices to fulfill one or more call-related demands of the first geographic region, wherein the one or more call-related demands include the first call-traffic demand forecast for each of the plurality of call destinations within the first geographic region; and
   routing, by the telecommunications system, a plurality of calls according to the first capacity allocation.

2. The method of claim 1 wherein each service priority is defined by a unique service level.

3. The method of claim 1 further comprising:
   receiving, by the telecommunications system, a first call-traffic demand forecast for each of a plurality of call destinations within a second geographic region; and
   generating, by the telecommunications system, a second capacity allocation, based on an objective of maximizing capacity allocation of one or more call-termination devices to fulfill one or more call-related demands of the second geographic region.

4. The method of claim 3 wherein the first capacity allocation is also based on allocating the call capacity of a particular call-termination device across both the first and second geographic regions.

5. The method of claim 1 wherein the first call-traffic demand forecast is based on the predicted call traffic that is expected in the time period to which the first capacity allocation will apply.

6. The method of claim 5 further comprising:
   receiving, by the telecommunications system, a second call-traffic demand forecast for each of a plurality of call destinations within the first geographic region, wherein the second call-traffic demand forecast is based on excess call traffic applicable to the time period to which a second capacity allocation will apply; and
   generating, by the telecommunications system, the second capacity allocation, for each service priority in the first set of service priorities, based on an objective of maximizing capacity allocation of one or more call-termination devices to fulfill one or more call-related demands of the first geographic region, wherein the one or more call-related demands include the second call-traffic demand forecast for each of the plurality of call destinations within the first geographic region.

7. The method of claim 1, further comprising transmitting, by the telecommunications system, capacity allocation data for each call-termination device that is allocable to the first geographic region, wherein the data is based on the first capacity allocation.

8. An telecommunications system comprising:
a receiver for receiving:
   i) a first call-traffic demand forecast for each of a plurality of call destinations within a first geographic region, and
   ii) a non-empty first set of service priorities attributed to the plurality of call destinations; and
a processor for generating a first capacity allocation for each service priority in the first set of service priorities, based on an objective of maximizing capacity allocation of one or more call-termination devices to fulfill one or more call-related demands of the first geographic region, wherein the one or more call-related demands include the first call-traffic demand forecast for each of the plurality of call destinations within the first geographic region.

9. The telecommunications system of claim 8 wherein each service priority is defined by a unique service level.

10. The telecommunications system of claim 8 wherein:
the receiver is also for receiving a first call-traffic demand forecast for each of a plurality of call destinations within a second geographic region; and
the processor is also for generating a second capacity allocation, based on an objective of maximizing capacity allocation of one or more call-termination devices to fulfill one or more call-related demands of the second geographic region.

11. The telecommunications system of claim 8 further comprising a route server for routing a plurality of calls according to the first capacity allocation.

12. The telecommunications system of claim 8 wherein the first call-traffic demand forecast is based on the predicted call traffic that is expected in the time period to which the first capacity allocation will apply.

13. The telecommunications system of claim 12 wherein:
the receiver is also for receiving a second call-traffic demand forecast for each of a plurality of call destinations within the first geographic region, wherein the second call-traffic demand forecast is based on excess call traffic applicable to the time period to which a second capacity allocation will apply; and
the processor is also for generating the second capacity allocation, for each service priority in the first set of service priorities, based on an objective of maximizing capacity allocation of one or more call-termination devices to fulfill one or more call-related demands of the first geographic region, wherein the one or more call-related demands include the second call-traffic demand forecast for each of the plurality of call destinations within the first geographic region.

14. The telecommunications system of claim 8, further comprising a transmitter for transmitting capacity allocation data for each call-termination device that is allocable to the first geographic region, wherein the data is based on the first capacity allocation.

15. A method comprising:
receiving, by a telecommunications system,
   i) a first call-traffic demand forecast for each of a plurality of call destinations within a first geographic region, wherein the first call-traffic demand forecast is based on the predicted call traffic that is expected in the time period to which a first capacity allocation will apply, and
   ii) a second call-traffic demand forecast for each of the plurality of call destinations within the first geographic region, wherein the second call-traffic demand forecast is based on excess call traffic applicable to the time period to which a second capacity allocation will apply;
generating, by the telecommunications system, the first and second capacity allocations, wherein the generating of:
   i) the first capacity allocation is based on the first call-traffic demand forecast for each of the plurality of call destinations within the first geographic region, and
   ii) the second capacity allocation is based on the second call-traffic demand forecast for each of the plurality of call destinations within the first geographic region; and
routing, by the telecommunications system, a plurality of calls according to the first and second capacity allocations.

16. The method of claim 15 wherein the first and second capacity allocations are generated, for each priority in a non-empty first set of service priorities, wherein the first set of service priorities is attributed to the plurality of call destinations, and wherein each service priority in the first set of service priorities is based on a characteristic of service level.

17. The method of claim 16 wherein the first capacity allocation is also based on comparing i) the sum of capacity allocations from all the call-termination devices to a first service level associated with a first call destination, to ii) the first call-traffic demand forecast for the first call destination.

18. The method of claim 17 wherein the second capacity allocation is also based on comparing i) the sum of capacity allocations from all the call-termination devices to the first service level associated with the first call destination, when determined after the first capacity allocation is generated, to ii) the second call-traffic demand forecast for the first call destination.

19. The method of claim 15 wherein the first capacity allocation is also based on a minimum number of suppliers of call service to a first call destination of the plurality of call destinations within the first geographic region.

20. The method of claim 15, further comprising transmitting, by the telecommunications system, capacity allocation data for each call-termination device that is allocable to the first geographic region, wherein the data is based on the first and second capacity allocations.

* * * * *